US006892071B2

(12) United States Patent
Park et al.

(10) Patent No.: US 6,892,071 B2
(45) Date of Patent: May 10, 2005

(54) HANDOVER METHOD IN WIRELESS TELECOMMUNICATION SYSTEM SUPPORTING USTS

(75) Inventors: Seong-Soo Park, Seoul (KR); Jin-Ho Cho, Kyoungki-Do (KR); In-Hong Lee, Kyoungki-Do (KR); Jin-Ick Lee, Kyonggi-Do (KR)

(73) Assignee: SK Telecom Co., Ltd. (KR)

( * ) Notice: Subject to any disclaimer, the term of this patent is extended or adjusted under 35 U.S.C. 154(b) by 420 days.

(21) Appl. No.: 09/927,729

(22) Filed: Aug. 9, 2001

(65) Prior Publication Data

US 2002/0045448 A1 Apr. 18, 2002

(30) Foreign Application Priority Data

Aug. 9, 2000 (KR) .......................................... 2000-46233
Oct. 14, 2000 (KR) .......................................... 2000-60536

(51) Int. Cl.[7] .......................... H04Q 7/20; H04B 7/216
(52) U.S. Cl. ....................... 455/436; 455/502; 455/442; 370/331; 370/332
(58) Field of Search ................................. 455/436, 442, 455/445, 450, 432.1, 502, 560, 552.1, 67.11, 423; 370/331–333, 335, 342, 441, 310.1, 467

(56) References Cited

U.S. PATENT DOCUMENTS 6,141,336 A * 10/2000 Bauchot et al. ............. 370/348
6,381,232 B1 * 4/2002 Strawczynski et al. ...... 455/442
6,570,856 B1 * 5/2003 Freeburg et al. .......... 370/310.1
6,628,631 B1 * 9/2003 Mazawa et al. ............ 370/331
2002/0061764 A1 * 5/2002 Kim et al. .................. 455/442

OTHER PUBLICATIONS

LG Electronics "Comparison of soft handover schemes for USTS" TSRG#18–01–0061, 3GPP TSG RAN WG 1#18, Boston, the U.S.A., Jan. 15th–18th, 2001 (5 pages; 1–5).
Wilman, Ah et al "Improved centric phase encoding orders for three dimensional magnetization prepared MR angiography". MR Research.
Laboratory, Mayo Clinic, Rochester Minn. MRM vol. 36, pp. 384–392.

* cited by examiner

Primary Examiner—David Hudspeth
Assistant Examiner—Kamran Afshar
(74) Attorney, Agent, or Firm—Blakely Sokoloff Taylor & Zafman

(57) ABSTRACT

A handover method in wireless telecommunication system supporting USTS is disclosed. The method for performing a handover of a mobile station in an asynchronous wireless telecommunication system supporting an uplink synchronous transmission scheme (USTS) mode, includes the steps of: a) performing a mode conversion of the mobile station from the USTS mode to a non-USTS mode based on a first signal measurement result from the mobile station; and b) performing a handover for the mobile station. In another embodiment of the present invention, the method further includes the step of: c) performing a mode conversion from the non-USTS mode to the USTS mode based on a second signal measurement result from the mobile station.

28 Claims, 16 Drawing Sheets

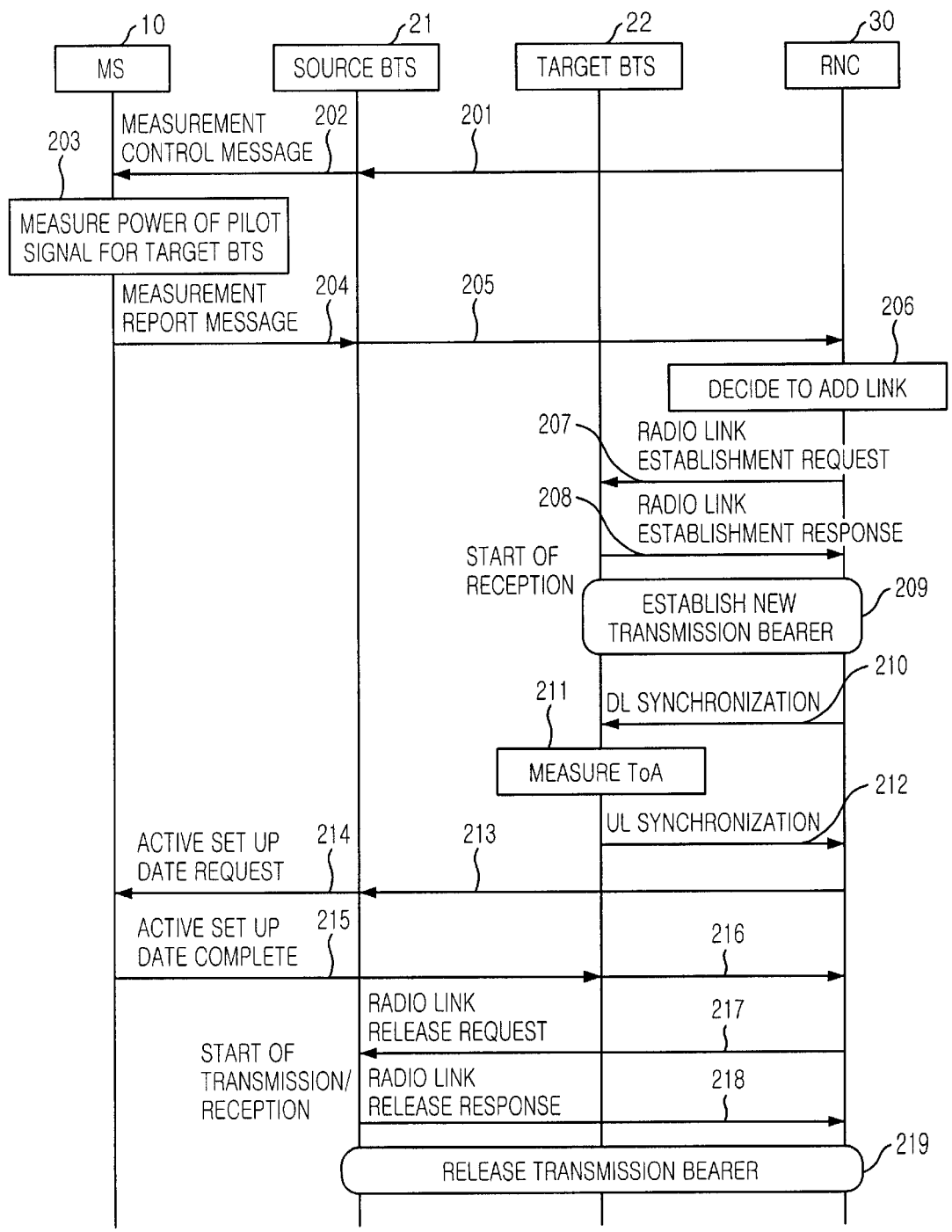

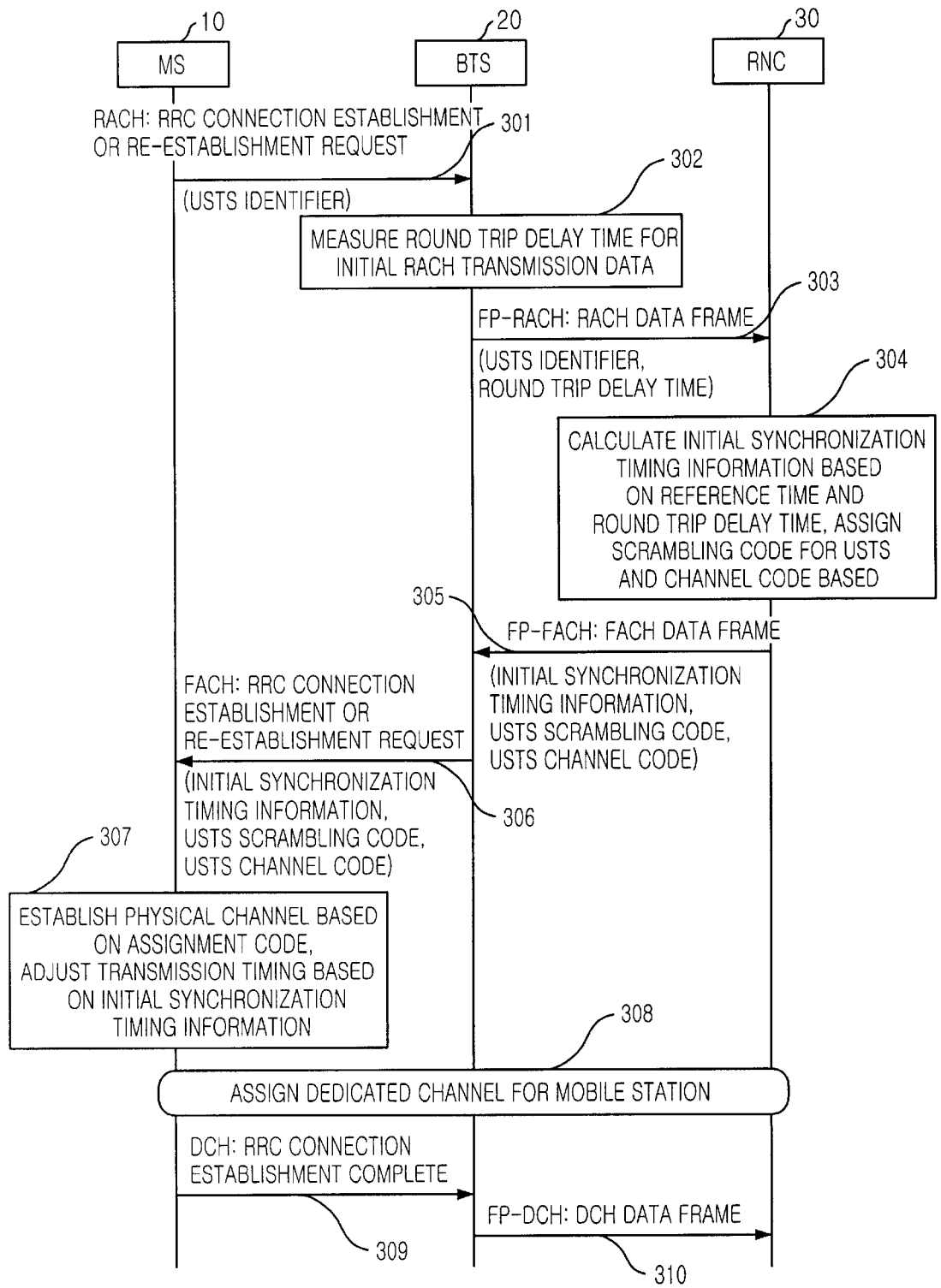

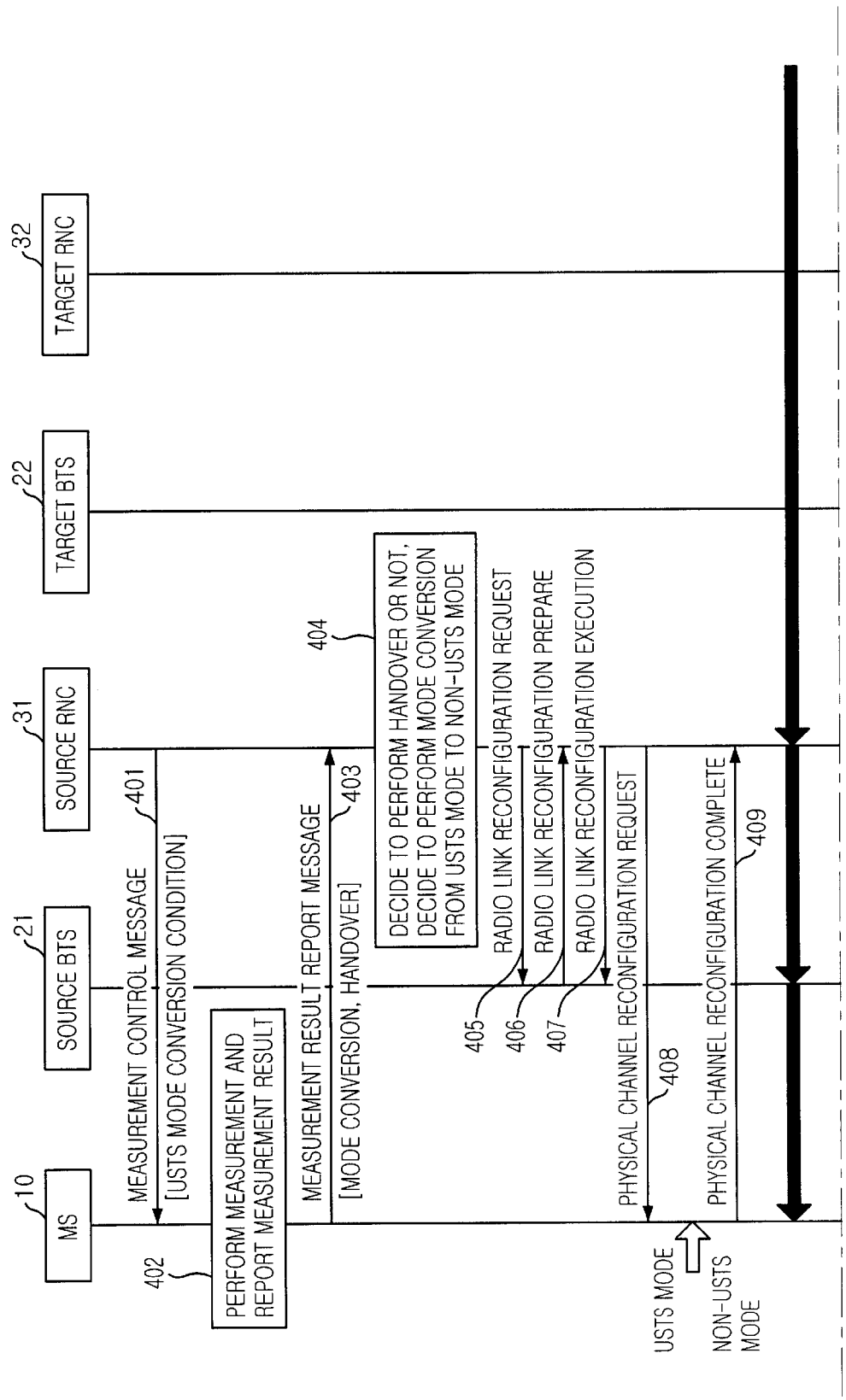

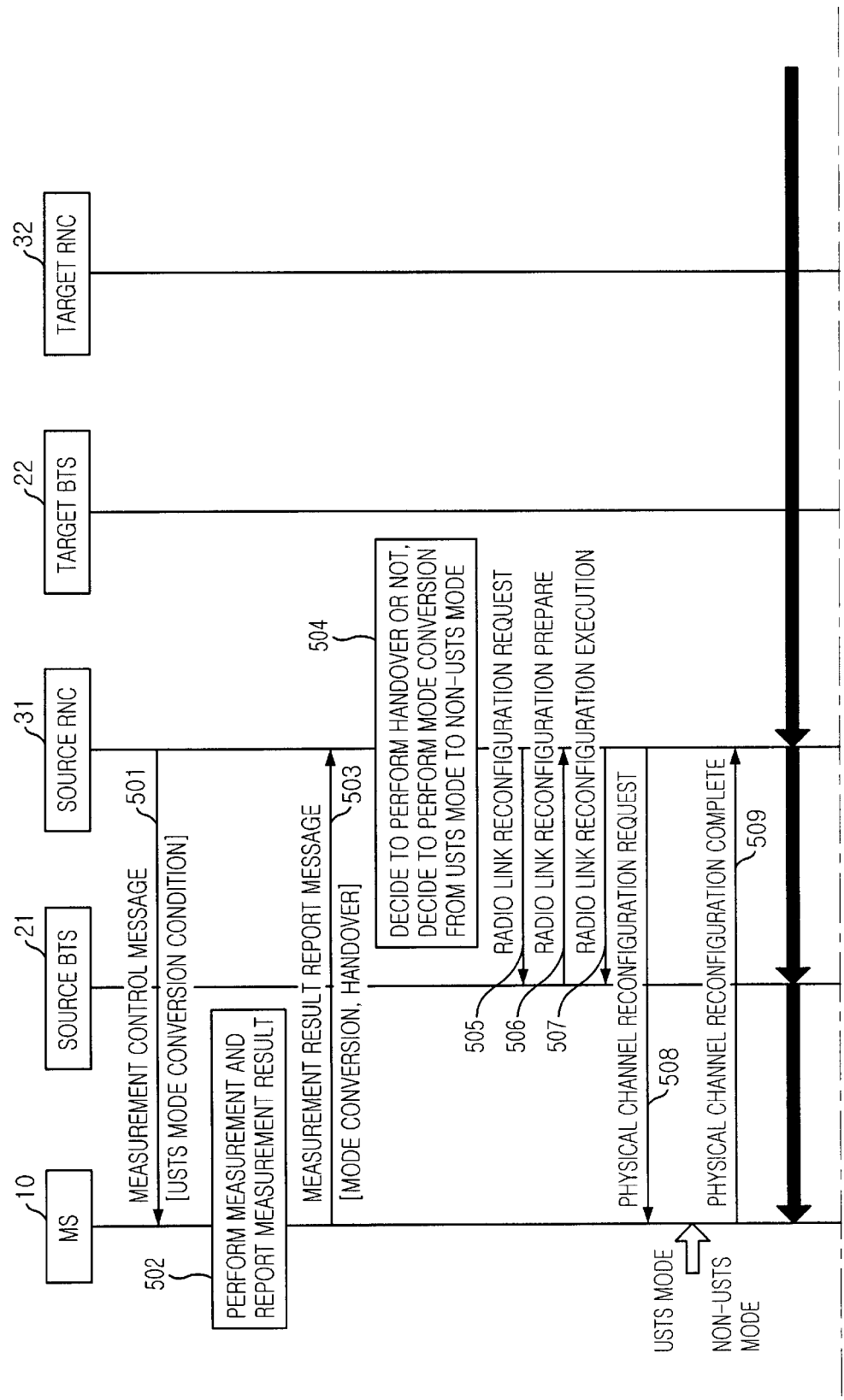

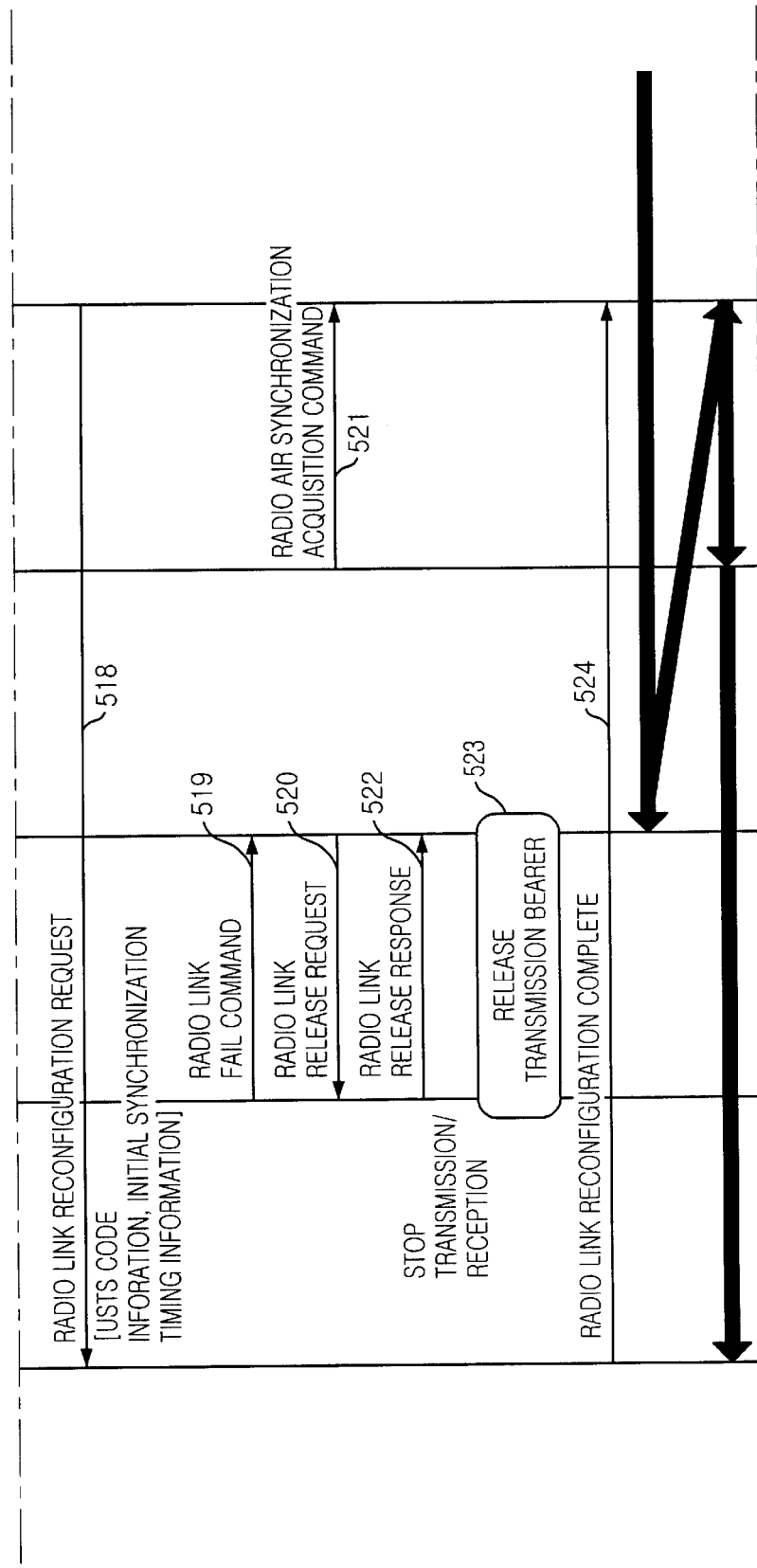

HANDOVER METHOD IN WIRELESS TELECOMMUNICATION SYSTEM SUPPORTING USTS

FIELD OF THE INVENTION

The present invention relates to a handover method in a wireless telecommunication system; and, more particularly, to a handover method in a code division multiple access (CDMA) wireless telecommunication system supporting an uplink synchronous transmission scheme (USTS).

DESCRIPTION OF THE PRIOR ART

A traffic channel between a base station (BTS, which is also referred to as "a node B") and a mobile station (MS, which is also referred to as "a user equipment") in a conventional code division multiple access (CDMA) system includes a forward channel (which is also referred to as "a downlink channel") and a reverse channel (which is also referred to as "an uplink channel"). At this time, multiple forward channels between the base station and multiple mobile stations located within a coverage (cell) of one base station are synchronized with each other based on timing information. Therefore, when demodulating signals, interference between the forward channels can be considerably reduced by using orthogonal codes that are orthogonal from each other.

However, since the timing information is not used in the reverse channel, the reverse channels cannot be synchronized. As the number of the reverse channels is increased, the interference between the reverse channels becomes increased. Therefore, a capacity of the reverse channel is limited.

In order to increase the capacity of the reverse channel, it is necessary for multiple reverse channels to be synchronized based on the same timing information. The reverse channels are synchronized, each of the synchronized reverse channels is identified by the orthogonal code, and then, the interference between the reverse channels can be minimized. This method is referred to as "an uplink synchronous transmission scheme (USTS)". The USTS technique has been discussed in a meeting group for standardization of the asynchronous international mobile telecommunication-2000 (IMT-2000) system.

In the system using the USTS, the reverse channels within a cell are synchronized, and each of the reverse channels is identified by the orthogonal code based on the synchronization between the MS and the BTS, thereby causing a serious problem in that a soft handover method using a diversity is difficult to be performed. Therefore, handover methods in the system using the USTS, which are required for providing a mobility of the MS, are not yet provided.

Conventional handover methods will be described in detail with reference to FIGS. 1 and 2.

FIG. 1 is a flow chart illustrating a conventional hard handover method in a wireless telecommunication system supporting USTS.

First, a radio network controller (RNC) 30 transmits a measurement control message to a mobile station (MS) 10 through a source base transceiver station (BTS) 21 at steps 101 and 102. The MS 10 measures a power intensity of a pilot signal for a new target BTS and reports a measurement result to the RNC 30 by transmitting a measurement report message through the source BTS 21 at steps 104 and 105. The RNC 30 determines whether handover is performed or not, assigns a scrambling code for USTS and a channel code at step 106, and requests a radio link establishment to the target BTS 22 at step 107. The target BTS 22 establishes a forward link channel at step 108, and then transmits a radio link establishment response message to the RNC 30 at step 109. New transmission bearer between the RNC 30 and the target BTS 22 is establish at step 110.

The RNC 30 requests the MS 10 to perform reconfiguration of a physical channel by transmitting a physical channel reconfiguration message having the scrambling code for the USTS, the channel code, initial synchronization information for the target BTS 22 to the MS 10 through the source BTS 21 at steps 111 and 112. The MS 10 establishes a new radio channel code based on a USTS code at step 113, and then transmits a physical channel reconfiguration complete message to the RNC 30 at steps 114 and 115. If the reconfiguration of the physical channel is failed, the source BTS 21 transmits a radio link establishment fail message to the RNC 30 at step 116.

If the reconfiguration of the physical channel is complete, the RNC 30 transmits a radio link release request message to the source BTS 21 at step 117, and then the source BTS 21 releases the radio link with the MS 10 and transmits a radio link release response message to the RNC 30 at step 118.

In the hard handover method as mentioned above, the RNC 30 should store an average round trip delay value of the MS to be handed over and know an accurate chip offset by the chip level between the BTSs. However, since it is difficult to obtain the accurate timing synchronization when performing the handover, the timing synchronization should be compensated by timing tracking. Therefore, there is a problem in that the mode conversion to USTS mode is difficult to be performed for a while after the handover.

FIG. 2 is a flow chart illustrating a conventional soft handover method in a conventional asynchronous wireless telecommunication system.

First, a radio network controller (RNC) 30 transmits a measurement control message through a source base transceiver station (BTS) 21 at steps 201 and 202, and then a mobile station (MS) measures a power intensity of a pilot signal for a target BTS 22 at step 203 and reports a measurement result to the RNC 30 by transmitting a measurement report message through the source BTS 21 at steps 204 and 205.

The RNC determines whether a handover is performed or not, in other words, whether an additional link is necessary or not at step 206. If the handover is necessary, the RNC 30 requests a target BTS 22 to establish a radio link at step 207, and the establishes new transmission bearer for the target BTS 22 if the radio link is established by the target BTS 22 and a radio link establishment response message is received from the target BTS 22 at steps 208 and 209. If the RNC 30 transmits a downlink (DL) synchronization message to the target BTS at step 210, the target BTS 22 transmits an uplink (UL) synchronization message after measuring a time of arrival (ToA) at steps 211 and 212.

The RNC 30 transmits an active set update request message to the MS 10 through the source BTS 21 at steps 213 and 214. The MS updates an active set, and then transmits an active set update complete message to the RNC 30 through the target BTS 22 at steps 215 and 216.

The RNC 30 requests the source BTS 21 to release the radio link at step 217, and then the source BTS transmits a radio link release response message to the RNC 30 at step 218 after releasing the radio link with the MS, to thereby release the transmission bearer between the RNC 30 and the source BTS at step 219.

In the soft handover method as mentioned above, the MS receives and combines the signals from at least two BTSs based on the diversity, if one of the signals becomes weak, and then the radio resource for the BTS transmitting the weak signal is released.

In order to apply the soft handover method to a case that a mobile station moves from a cell supporting the USTS to a cell not supporting the USTS, the MS should be identified. In other words, in the general IMT-2000 system, the mobile station is identified by the scrambling code, however, in the mobile station supporting the USTS, the scrambling code is used for identifying the cell, i.e., the BTS. Therefore, if multiple mobile stations try to perform the soft handover simultaneously, the target BTS recognizes all of signals from the multiple mobile stations as the signals from one mobile station, such that the signals cannot be decoded. If the mobile station moves between the cells supporting the USTS, since a different scrambling code is used for each BTS, the mobile station should have two or more transmitters.

SUMMARY OF THE INVENTION

Therefore, it is an object of the present invention to provide a handover method which provides a mobility to a mobile station based a mode conversion between an uplink synchronous transmission scheme (USTS) mode and a non-USTS mode in a CDMA telecommunication system supporting the USTS.

In accordance with an aspect of the present invention, there is provided a method for performing a handover of a mobile station in an asynchronous wireless telecommunication system supporting an uplink synchronous transmission scheme (USTS) mode, comprising the steps of: a) at a radio network controller, performing a mode conversion of the mobile station from the USTS mode to a non-USTS mode based on a first signal measurement result from the mobile station; and b) performing a handover for the mobile station. The method further includes the step of: c) performing a mode conversion from the non-USTS mode to the USTS mode based on a second signal measurement result from the mobile station.

In accordance with another aspect of the present invention, there is provided a method for performing a handover of a mobile station from a cell not supporting an uplink synchronous transmission scheme (USTS) mode to a cell supporting the USTS mode, the method comprising the steps of: a) performing a handover of the mobile station; and b) performing a mode conversion of the mobile station from a non-USTS mode to the USTS mode based on a signal measurement result from the mobile station.

In accordance with further another aspect of the present invention, there is provided a computer readable recording media storing instructions for executing a method for performing a handover of a mobile station in an asynchronous wireless telecommunication system supporting an uplink synchronous transmission scheme (USTS) mode, the method comprising the steps of: a) at a radio network controller, performing a mode conversion of the mobile station from the USTS mode to a non-USTS mode based on a first signal measurement result from the mobile station; and b) performing a handover for the mobile station. The method further includes the step of: c) performing a mode conversion from the non-USTS mode to the USTS mode based on a second signal measurement result from the mobile station.

In accordance with still further another aspect of the present invention, there is provided a computer readable recording media storing instructions for executing a method for performing a handover of a mobile station from a cell not supporting an uplink synchronous transmission scheme (USTS) mode to a cell supporting the USTS mode, the method comprising the steps of: a) performing a handover of the mobile station; and b) performing a mode conversion of the mobile station from a non-USTS mode to the USTS mode based on a signal measurement result from the mobile station.

BRIEF DESCRIPTION OF THE DRAWINGS

Other objects and aspects of the invention will become apparent from the following description of the embodiments with reference to the accompanying drawings, in which:

FIG. 2 is a flow chart illustrating a conventional soft handover method in a conventional asynchronous wireless telecommunication system;

FIG. 3 is a flow chart illustrating an initial synchronization acquisition method in an asynchronous wireless telecommunication system supporting USTS in accordance with the present invention;

FIGS. 4A to 4D are flow charts illustrating a soft handover method in an asynchronous wireless telecommunication system supporting USTS in accordance with the present invention;

FIGS. 5A to 5D are flow charts illustrating a hard handover method in an asynchronous wireless telecommunication system supporting USTS in accordance with the present invention;

PREFERRED EMBODIMENTS OF THE INVENTION

Figure 1:
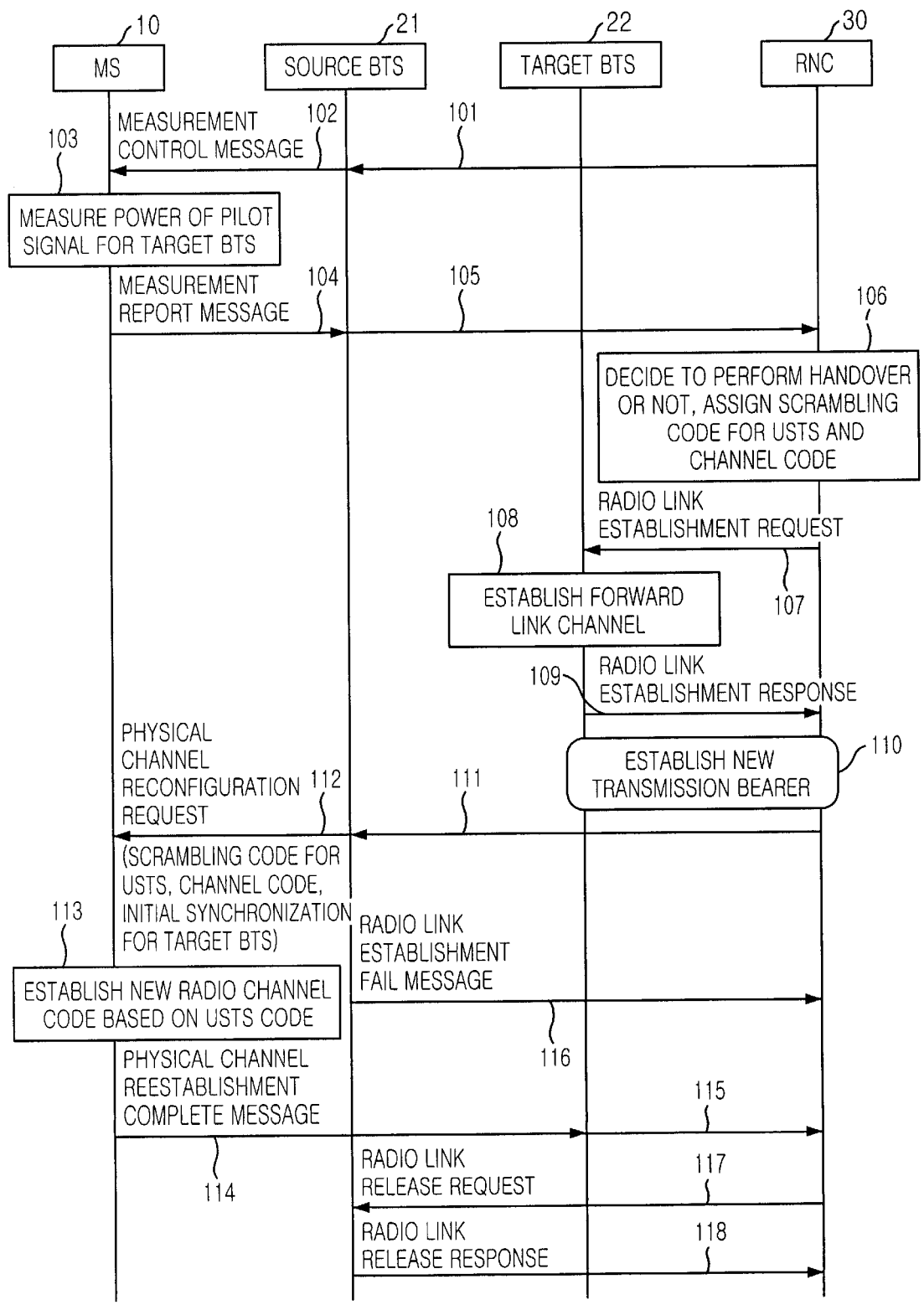
FIG. 1 is a flow chart illustrating a conventional hard handover method in an asynchronous wireless telecommunication system supporting USTS.
Figure 4B:
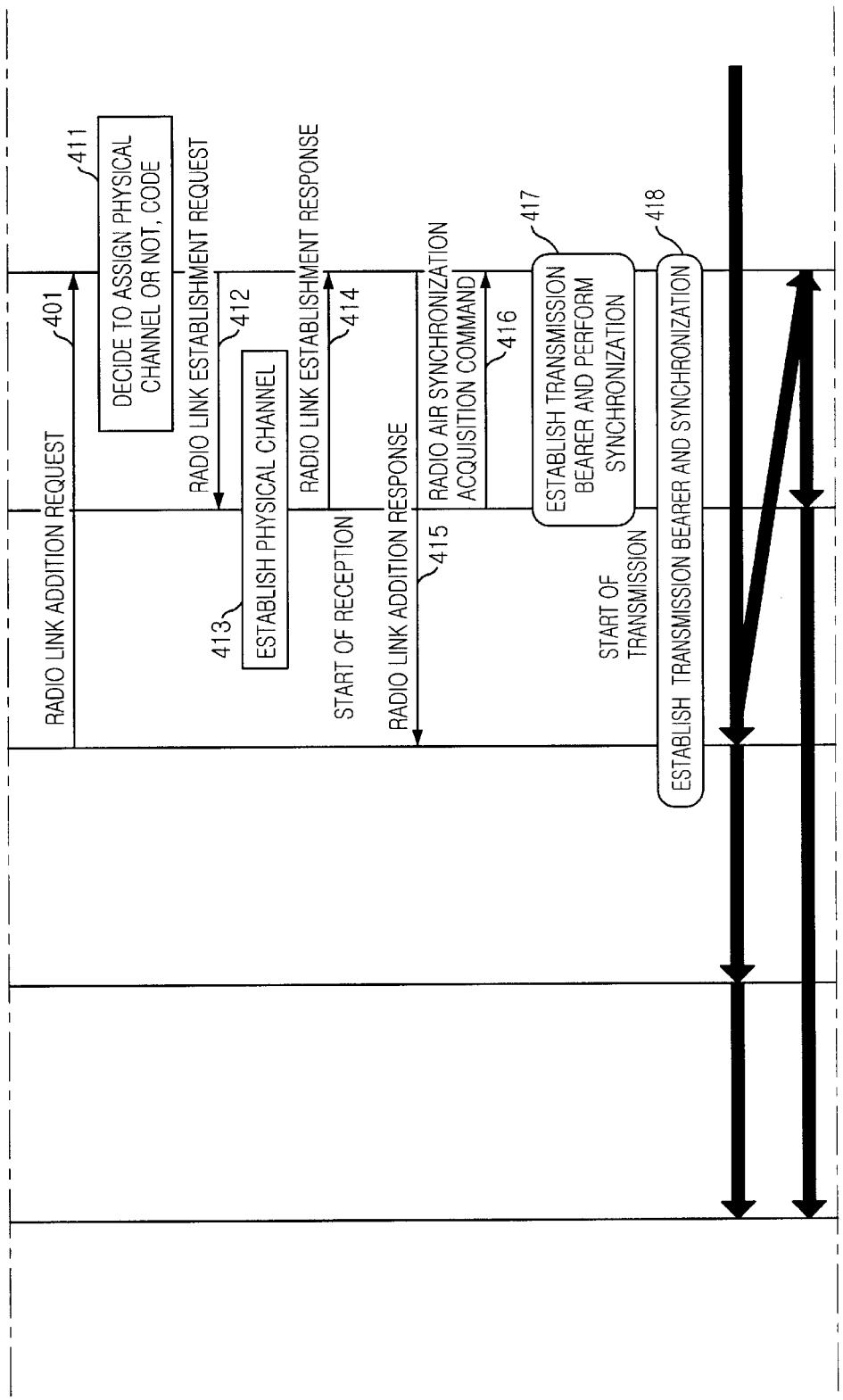
Figure 4C:
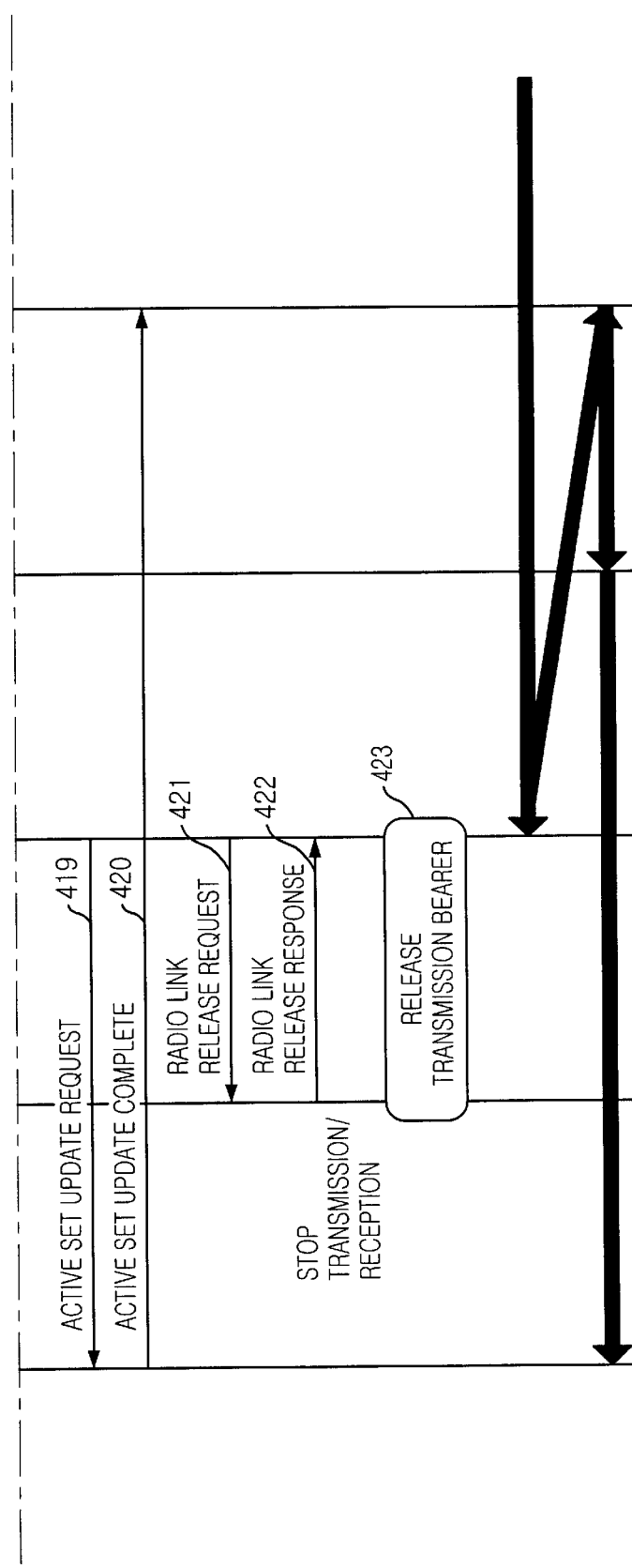
Figure 4D:
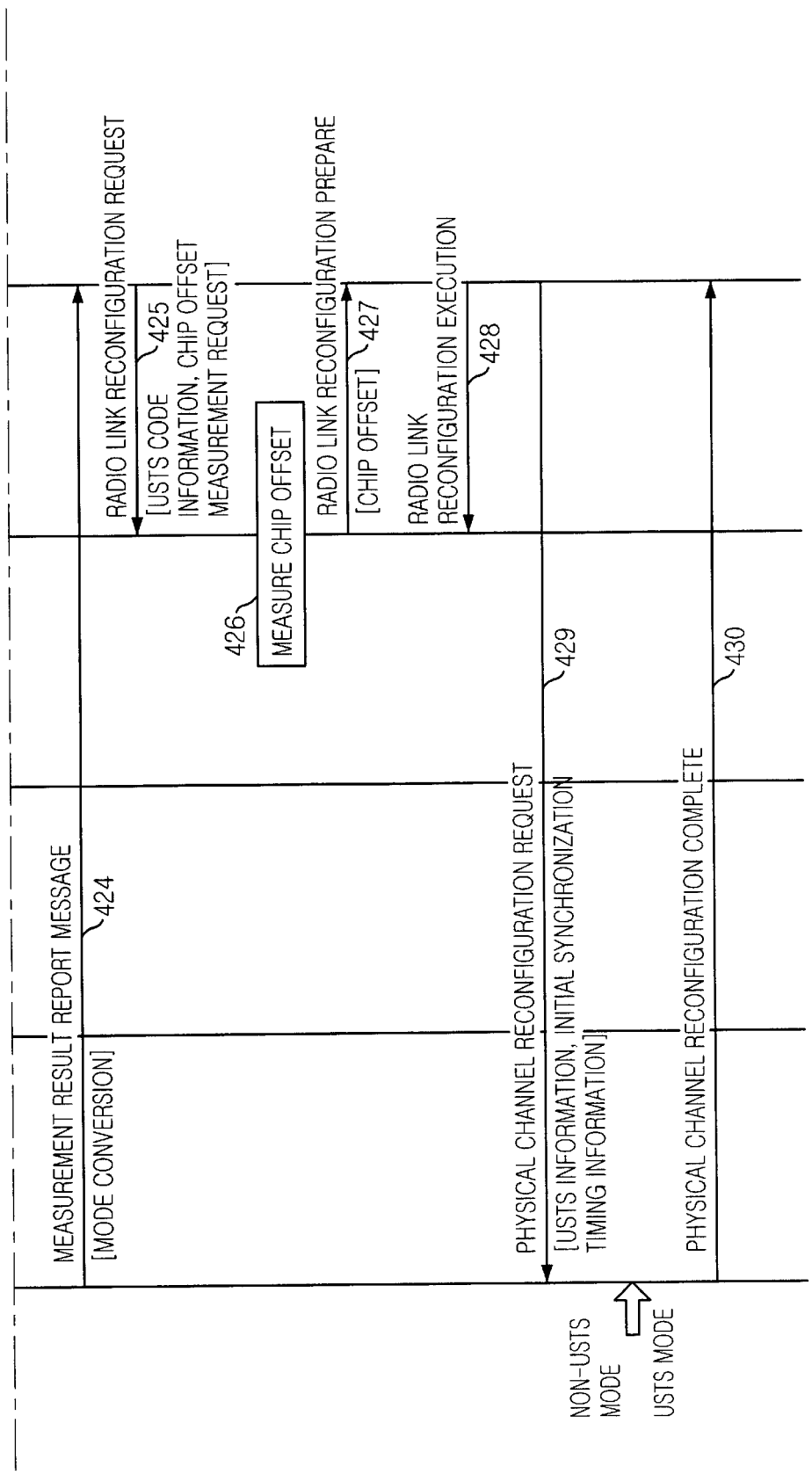
Figure 5B:
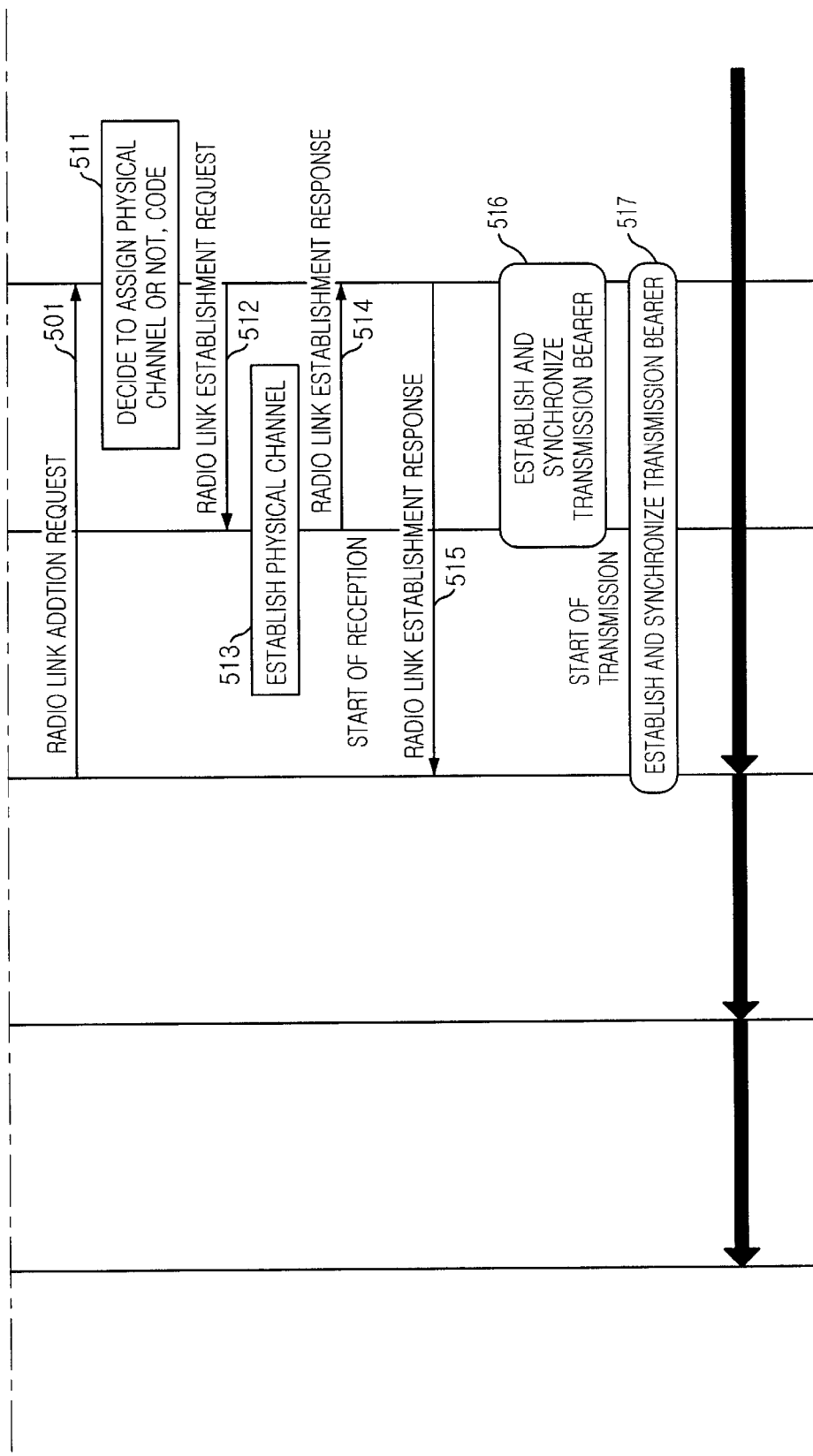
Figure 5D:
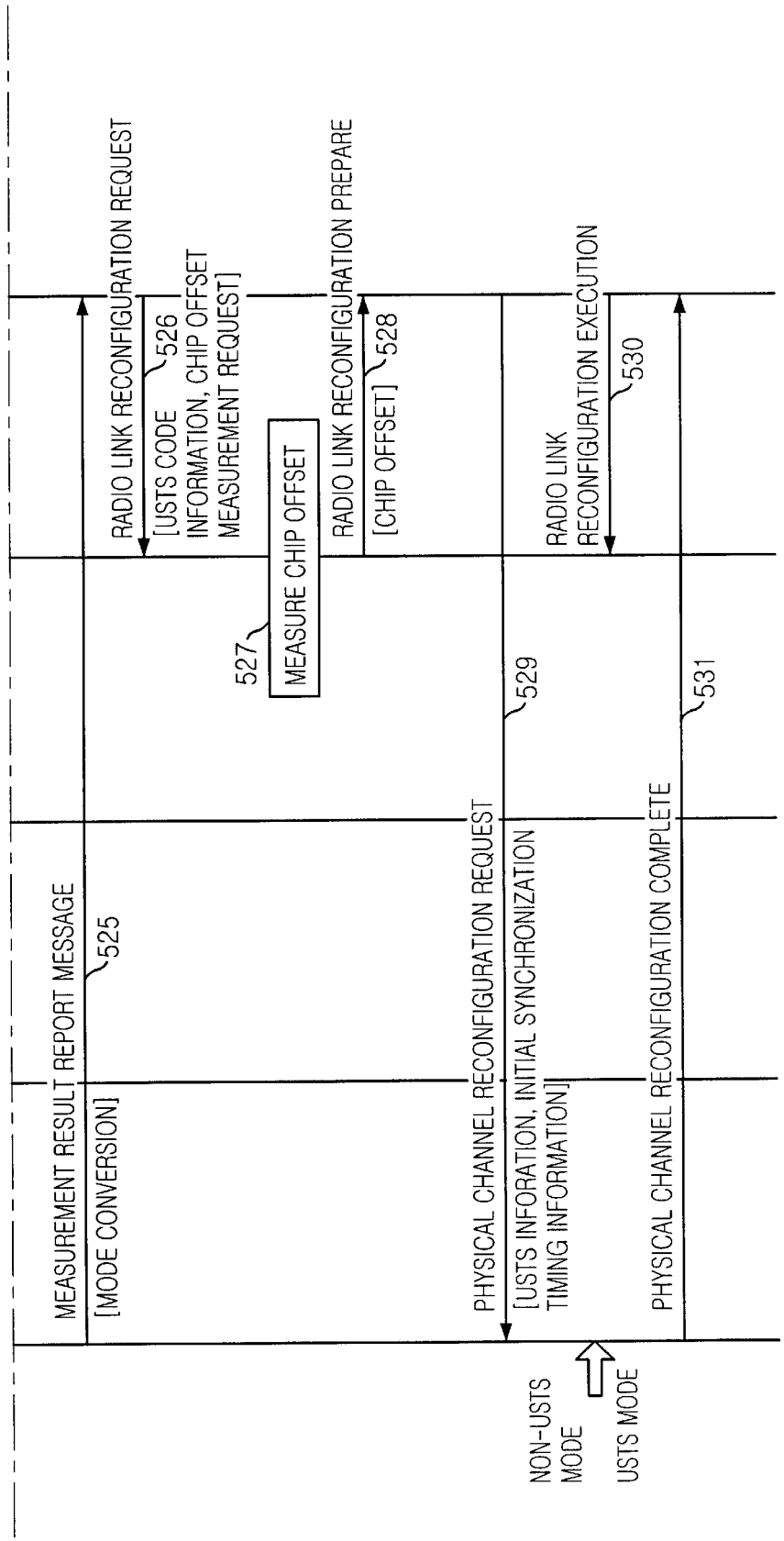

First, the uplink synchronous transmission scheme (USTS) technology will be described in more detail.

In the system supporting the USTS, by controlling the transmission time of the data frame in the reverse channel, i.e., the transmission time of the data frame from the MS within its cell, the BTS makes the reverse signals using the orthogonal code to be simultaneously arrived at the BTS, and therefore characteristics of the orthogonal code can be maximized, to thereby considerably increase the transmission capacity of the cell.

In other words, the USTS increases efficiency of the reverse channel as much as that of the forward channel. For the USTS, a scrambling code and an orthogonal channel code are used for identifying a cell and a channel of a mobile station. The BTS has a reference time for its cell, and the MS is not affected on the reference time of the BTS before an initial access to the BTS.

If the MS tries an access to the BTS through a random access channel, the BTS calculates a round trip delay time of the MS by obtaining an arrival time of the access signal. If the arrival time for the reverse signal from the MS is faster than the reference time, the transmission time of the message in the MS is delayed by a time difference between the arrival time and the reference time. On the contrary, the transmission time of the message in the MS is advanced by the time difference. As a result, the reverse signal from each MS is synchronized on the basis of the arrival time at the BTS. Initial synchronization information necessary for the synchronization of the reverse signal is inserted to a forward signaling message, which is a response to the initial access, and then transmitted to the MS.

The processes for the initial synchronization are performed when the MS tries a random access to the BTS and requests a dedicated channel code. If the MS acquires the initial synchronization, the synchronization is applied to transmission of the dedicated channel. The timing synchronization is maintained in transmission of the dedicated channel thereafter based on the dedicated signaling.

The timing synchronization makes the orthogonal code be used for the signals transmitted from the MSs each of which uses the same scrambling code. The orthogonal code has a faster chip rate than the data transmission rate, and therefore, a bandwidth of the transmission data multiplied by the orthogonal code is increased to 1/chip rate. The orthogonal code is referred to as "a spreading code". In the forward channel, the orthogonal code is also referred to as "a channelization code". Since the orthogonal code has a high correlation with the same code, the orthogonal code is accurately decoded. However, the orthogonal code has zero (0) correlation with the other codes. Each of the multiple reverse channels from the multiple mobile stations to the base station is multiplied by a different orthogonal code in order to identify the channel and then multiplied by the same scrambling code in order to synchronize the multiple reverse channels.

The USTS technology, which uses the same scrambling code for the multiple channels within one cell and the orthogonal code for each channel of the MS, can improve performance of the system in which the MS does not almost move, in other words, there is no handover.

When performing the handover in the system supporting the USTS, there are some problems in that the same channel code should be assigned to a reversed channel in a new cell and the timing between the different scrambling codes should be synchronized. Diversity in which a signal from one MS is received at the multiple BTS and combined at the network, cannot be applied to the radio telecommunication system supporting the USTS, to thereby decrease the performance of the system during the handover.

In order to perform the soft handover of the MS, frequencies of the channels for transmitting data from the BTSs to the MS should be identical, and it should be possible for MS? to transmit the data to two BTSs simultaneously. However, in the reverse channel of the MS supporting the USTS, since the cell is identified based on the scrambling code, the MS cannot transmit the data to two BTSs simultaneously. Also, since each of the channels for the MSs having the same scrambling code is identified by the orthogonal channel code, the identical channel code is difficult to be reused when performing the handover. Therefore, the MS supporting the USTS is handed over based on the hard handover method and should acquire the initial synchronization in a new cell.

In the present invention, to solve the problems as mentioned above, before the handover, a mode conversion of the USTS mode and the non-USTS mode is performed based on a signal measurement result reported by the MS.

When the MS operates in the non-USTS mode, the scrambling code and the channel code are respectively used for identifying each MS and each of the channels used by the MS as in the general asynchronous IMT-2000 system. Therefore, the MS of the non-USTS mode can be handed over based on all of the handover methods used in the general IMT-2000 system. The USTS mode has advantages under an environment in that the handover is not performed. Therefore, by using both of two modes, the handover can be performed without decrease of performance.

Hereinafter, preferred embodiments of the present invention will be described in detail referring to the accompanying drawings.

FIG. 3 is a flow chart illustrating an initial synchronization acquisition method in an asynchronous wireless telecommunication system supporting USTS in accordance with the present invention.

A mobile station (MS) requests a base transceiver station (BTS) to establish or re-establish a connection of a radio resource control (RRC) by transmitting a USTS identifier representing that a USTS is supported or not, to the BTS through a random access channel (RACH) at step 301. The BTS 20 measures a round trip delay time for an initial RACH transmission data at step 302, and transmits the USTS identifier and the round trip delay time to a radio network controller (RNC) through a data frame of a frame protocol RACH (FP-RACH) at step 303.

The RNC 30 determines whether the MS supports the USTS or not. If the MS supports the USTS, the RNC 30 assigns a scrambling code for the USTS and a channel code based on a channel assignment scheme, and calculates initial synchronization timing information based on a reference time for a cell and a difference between the reference time and the round trip delay time at step 304. The RNC 30 transmits the initial synchronization timing information, the scrambling code for the USTS and the channel code through a data frame of a frame protocol-forward access channel (FP-FACH) to the BTS at step 305, and then the BTS 20 requests the MS 10 to establish or re-establish the RRC connection by transmitting the initial synchronization timing information, the scrambling code for the USTS and the channel code to the MS 10 at step 306.

The MS 10 establishes a physical channel based on the scrambling code for the USTS and the channel code, and adjusts a transmission time based on the initial synchronization timing information at step 307. When a dedicated channel (DCH) for the MS 10 is assigned at step 308, the MS 10 transmits a RRC connection establishment complete message to the BTS through the DCH at step 309, and then the BTS 20 transmits a message corresponding to the RRC connection establishment complete message to the RNC through a data frame of a frame protocol-dedicated channel (FP-DCH) at step 310.

If the dedicated channel is established between the MS and the BTS, the data is transmitted through the dedicated channel, and the difference between the reference time and the transmission time due to movement of the MS is adjusted based on control information transmitted through the dedicated channel.

FIGS. 4A to 4D are flow charts illustrating a soft handover method in an asynchronous wireless telecommunication system supporting USTS in accordance with the present invention.

Referring to FIGS. 4A to 4D, a soft handover method in accordance with the present invention includes a mode conversion process from a USTS mode to a non-USTS mode, a handover process and a mode conversion process from the non-USTS mode to the USTS mode.

In the present invention, before the handover of a mobile station (MS) 10, the mode conversion from the USTS mode to the non-USTS mode is performed based on a signal measurement result. A source radio network controller (RNC) 31 transmits a measurement control message having conditions for USTS mode conversion to the MS 10 at step 401.

The MS 10 measures power intensities of pilot signals for a current service cell and adjacent cells, and reports measurement results to the source RNC 31 by transmitting a measurement result report message having information for the mode conversion and the handover at steps 402 and 403.

The source RNC 31 determines whether they should be performed or not, the handover and the mode conversion from the USTS mode to the non-USTS mode at step 404. The mode conversion to the non-USTS is performed if a ratio value of the power intensity of the pilot signal for a current service cell to the power intensity of the pilot signal for the adjacent cell, is smaller than a lower threshold, e.g., −5 dB. The source RNC 31 requests the source BTS 21 to perform reconfiguration of a radio link at step 405. The source RNC 31 receives a radio link reconfiguration prepare message from the source BTS 21 at step 406, and then commands the source BTS 21 to perform the reconfiguration of the radio link at step 407 and requests the MS 10 to perform the reconfiguration of the physical channel at step 408.

For the mode conversion from the USTS mode to the non-USTS mode, a scrambling code and a channel code are assigned to physical layers of the source BTS 21 and the MS 10, after completion of the mode conversion, the MS 10 informs the source RNC 31 that the establishment of the physical channel is complete at step 409. From this time, timing tracking due to the round trip delay is performed by the receiver of the BTS.

For the handover, a radio link establishment is requested to a target RNC 32 and a target BTS 22. The target BTS assigns a physical channel and completes establishment of transmission bearer.

When establishing a radio link between the source RNC 31 and the target RNC 32, the source RNC 31 transmits a radio link addition request message having the USTS identifier to the target RNC 32 at step 410.

The target RNC 32 decides to assign a physical channel and a code at step 411 and requests the target BTS 22 to establish a radio link at step 412. The target BTS 22 establishes the physical channel at step 413, and then, transmits a radio link establishment response message to the target RNC 32 and starts to receive a signal.

The target RNC 32 transmits a radio link addition response message to the source RNC 31 at step 415, establishes the transmission bearer with the target BTS 22 and performs synchronization in response to a radio synchronization acquisition command from the target BTS 22 at steps 416 and 417, and then starts transmission/reception. One skilled in the art appreciate that the transmission of the radio synchronization acquisition command message is a supplementary process. The target RNC 32 also establishes and transmission bearer with the source BTS 22 and performs synchronization at step 418.

When the establishment of the radio channel and the transmission bearer is complete, data signals are simultaneously transmitted through two BTSs, and the MS 10 combines the data signals received from two BTSs and decodes the data signal.

When the handover is performed and an active set is updated, all of the wire/wireless transmission bearer for the source RNC 31 and the source BTS 21 is released, and the target RNC 32 and the target BTS 22 service for the MS.

The source RNC 31 request the MS 10 to update an active set at step 419, the MS updates the active set and then transmits an active set update complete message to the target RNC 32 at step 420.

When the source RNC 31 requests to release the radio link to the source BTS 21 at step 421, the source BTS 21 releases the radio link, transmits a radio link release response message at step 422 and stops the transmission/reception. And then, the transmission bearer among the MS, the source RNC 31 and the source BTS 21 is released at step 423.

After the handover, if a ratio value of the power intensity of the pilot signal for a current service cell to the power intensity of the pilot signal for an adjacent cell, is larger than a higher threshold, e.g., 5 dB, the MS 10 transmits a measurement result report message having the mode conversion information to the target RNC 32 at step 424.

The target RNC 32, which receives the measurement result report message from the MS 10, assigns a scrambling code for the USTS and a channel code as the same as those in the current bearer, requests a reconfiguration of a radio link by transmitting a chip offset measurement request indicator in order to acquire an initial synchronization for the assigned codes and the dedicated channel, to the target BTS 22 at step 425. Here, for measuring the chip offset between the target RNC 32 and the target BTS 22, a measurement control message and the measurement response message can be additionally used.

The target BTS 22 measures and transmits the chip offset to the target RNC 32 at step 426, and prepares the reconfiguration of the radio link at step 427. The target RNC 32 informs the target BTS 22 of a start time of the USTS mode and commands to perform the reconfiguration of the radio link at step 428, and then the target BTS 22 performs the reconfiguration of the radio link.

The target RNC 32 transmits to the MS a physical channel reconfiguration request message having the scrambling code and channel code necessary for the mode conversion to the USTS mode and the initial synchronization timing information at step 429, thereby commanding to perform the USTS operation. The MS 10 performs the reconfiguration of the physical channel based on the received parameters, shifts from the non-USTS mode to the USTS mode and then informs the target BTS 32 that the reconfiguration of the physical channel is complete at step 430.

One ordinary skilled in the art may appreciate that there are various changes and modifications of the embodiment.

One case is a handover from a BTS supporting the USTS to a BTS not supporting the USTS, in which only the mode conversion process from the USTS to the non-USTS and the handover process are performed. In other words, the mode conversion process from the non-USTS to the USTS is not performed.

Another case is a handover from a BTS not supporting the USTS to a BTS supporting the USTS, in which only the handover process and the mode conversion process from the non-USTS to the USTS are performed. In other words, the mode conversion process from the USTS to the non-USTS is not performed.

FIGS. 5A to 5D are flow charts illustrating a hard handover method in an asynchronous wireless telecommunication system supporting USTS in accordance with the present invention. The hard handover method in this embodiment is similar to the soft handover method described with reference to FIGS. 4A to 4D except that there is only one radio link through which data is transmitted.

Referring to FIGS. 5A to 5D, a hard handover method in accordance with the present invention includes a mode conversion process from a USTS mode to a non-USTS mode, a handover process and a mode conversion process from the non-USTS mode to the USTS mode.

In this embodiment, before the handover of a mobile station (MS) 10, the mode conversion from the USTS mode to the non-USTS mode is performed based on a signal measurement result. A source radio network controller (RNC) 31 transmits a measurement control message having conditions for USTS mode conversion to the MS 10 at step 501.

The MS 10 measures power intensities of pilot signals for a current service cell and adjacent cells, and reports measurement results to the source RNC 31 by transmitting a measurement result report message having information for the mode conversion and the handover at steps 502 and 503.

The source RNC 31 determines whether they should be performed or not, the handover and the mode conversion from the USTS mode to the non-USTS mode at step 504. The mode conversion to the non-USTS is performed if a ratio value of the power intensity of the pilot signal for the current service cell to the power intensity of the pilot signal for the adjacent cell, is smaller than a lower threshold, e.g., −5 dB. The source RNC 31 requests the source BTS 21 to perform a reconfiguration of a radio link at step 505. The source RNC 31 receives a radio link reconfiguration prepare message from the source BTS 21 at step 506, and then commands the source BTS 21 to perform the radio link reconfiguration at step 507 and requests the MS 10 to perform the reconfiguration of the physical channel reconfiguration at step 508.

For the mode conversion from the USTS mode to the non-USTS mode, a scrambling code and a channel code are assigned to physical layers of the source BTS 21 and the MS 10, after completion of the mode conversion, the MS 10 informs the source RNC 31 that the establishment of the physical channel is complete at step 509. From this time, timing tracking due to the round trip delay is performed by the receiver of the BTS.

For the handover, a radio link establishment is requested to a target RNC 32 and a target BTS 22. The target BTS assigns a physical channel and completes establishment of transmission bearer.

When establishing a radio link between the source RNC 31 and the target RNC 32, the source RNC 31 transmits a radio link establishment request message having the USTS identifier to the target RNC 32 at step 510.

The target RNC 32 decides to assign a physical channel and a code at step 511 and requests the target BTS 22 to establish a radio link at step 512. The target BTS 22 establishes the physical channel at step 513, and then transmits a radio link establishment response message to the target RNC 32 and starts to receive a signal.

The target RNC 32 transmits a radio link establishment response message to the source RNC 31 at step 515, establishes transmission bearer with the target BTS 22 and performs synchronization at step 516, and then starts transmission/reception. The target RNC 32 also establishes and transmission bearer with the source BTS 22 and performs synchronization at step 517.

The target RNC 32 transmits a radio link reconfiguration request message having the USTS code information and the initial synchronization timing information to the MS 10 at step 518.

If the source BTS 21 informs the source RNC 31 that the radio link fails at step 519, the source RNC 31 requests the source BTS 21 to release the radio link at step 520, the source BTS 21 transmits a radio link release response message to the source RNC 31 at step 522 and stops transmission/reception. Then, the transmission bearer between the source RNC 31 and the source BTS 21 is released at step 523.

The MS 10 transmits a radio link reconfiguration complete message to the target RNC 32 at step 524.

After the handover, if a ratio value of the power intensity of the pilot signal for a current service cell to the power intensity of the pilot signal for an adjacent cell, is larger than a higher threshold, the MS 10 transmits a measurement result report message having the mode conversion information to the target RNC 32 at step 525.

The target RNC 32, which receives the measurement result report message from the MS 10, assigns a scrambling code for the USTS and a channel code as the same as those in the current bearer, requests reconfiguration of a radio link by transmitting a chip offset measurement request indicator in order to acquire an initial synchronization for the assigned codes and the dedicated channel, to the target BTS 22 at step 526. Here, for measuring chip offset between the target RNC 32 and the target BTS 22, a measurement control message and the measurement response message can be additionally used.

The target BTS 22 measures and transmits the chip offset to the target RNC 32 at step 527, and prepares the reconfiguration of the radio link at step 528. The target RNC 32 informs the target BTS 22 of a start time of the USTS mode and commands to perform the reconfiguration of the radio link at step 530, and then the target BTS 22 performs the reconfiguration of the radio link.

The target RNC 32 transmits to the MS 10 a physical channel reconfiguration request message having the scrambling code and channel code necessary for the mode conversion to the USTS mode and the initial synchronization timing information at step 529, thereby commanding to perform the USTS operation. The MS 10 performs the reconfiguration of the physical channel based on the received parameters, shifts from the non-USTS mode to the USTS mode and then informs the target BTS 32 that the reconfiguration of the physical channel is complete at step 531.

One ordinary skilled in the art may appreciate that there are various changes and modifications of the embodiment.

One case is a handover from a BTS supporting the USTS to a BTS not supporting the USTS, in which only the mode conversion process from the USTS to the non-USTS and the handover process are performed. In other words, the mode conversion process from the non-USTS to the USTS is not performed.

Another case is a handover from a BTS not supporting the USTS to a BTS supporting the USTS, in which only the handover process and the mode conversion process from the non-USTS to the USTS are performed. In other words, the mode conversion process from the USTS to the non-USTS is not performed.

Hereinafter, the mode conversion process from the non-USTS to the USTS mode will be described in detail with reference to FIGS. 6 to 10.

In general, when the handover is complete and the link between the MS and the previous cell in the USTS mode is released, there is a radio link between the MS and a new cell to be communicated in the non-USTS mode.

Therefore, the mode conversion of the MS from the non-USTS mode to the USTS mode is necessary. For the mode conversion, timing adaptation between the BTS and the MS should be smoothly performed.

For the smooth timing adaptation, the RNC calculates a time difference between a reference time and a transmission start time based on the transmission start time of a dedicated physical control channel (DPCCH) transmitted from the BTS to the MS, a round trip delay of the DPCCH and a reference time T_ref. The time difference value is transmitted to the BTS and the MS, and then used for adjusting the transmission start time of the DPCCH in the BTS and used for adjusting the transmission start time of a dedicated physical channel (DPCH) in the MS.

There are two cases in synchronization of the transmission time necessary for the USTS in accordance with the reference time. One is that the transmission time is advanced. The other is that the transmission time is delayed.

In order to adapt the initial synchronization timing, the transmission of the DPCH frame should be adjusted by the time difference T_differ. If the transmission of the DPCH frame should be delayed by the time difference T_differ, the transmission is interrupted for the time difference T_differ. On the contrary, if the transmission of the DPCH frame should be advanced by the time difference T_differ, the DPCH frame is overlapped to the DPCH frame transmitted before the USTS mode, to thereby lose overlapped data frames.

Therefore, it is required a method for preventing the loss of the data frame. A compressed mode used for a handover in a wide CDMA (W-CDMA) system can solve the problem.

When a time difference is calculated for the mode conversion from the non-USTS mode to the USTS mode, the BTS increases the data transmission rate in a moment, the data transmission time becomes reduced, and then another operation, e.g., synchronization of timing can be performed for an idle time, which is referred to as "a compressed mode".

First, cases of the timing synchronization, i.e., advance and delay of the timing will be described with reference to FIGS. 6 and 7.

Figure 6:
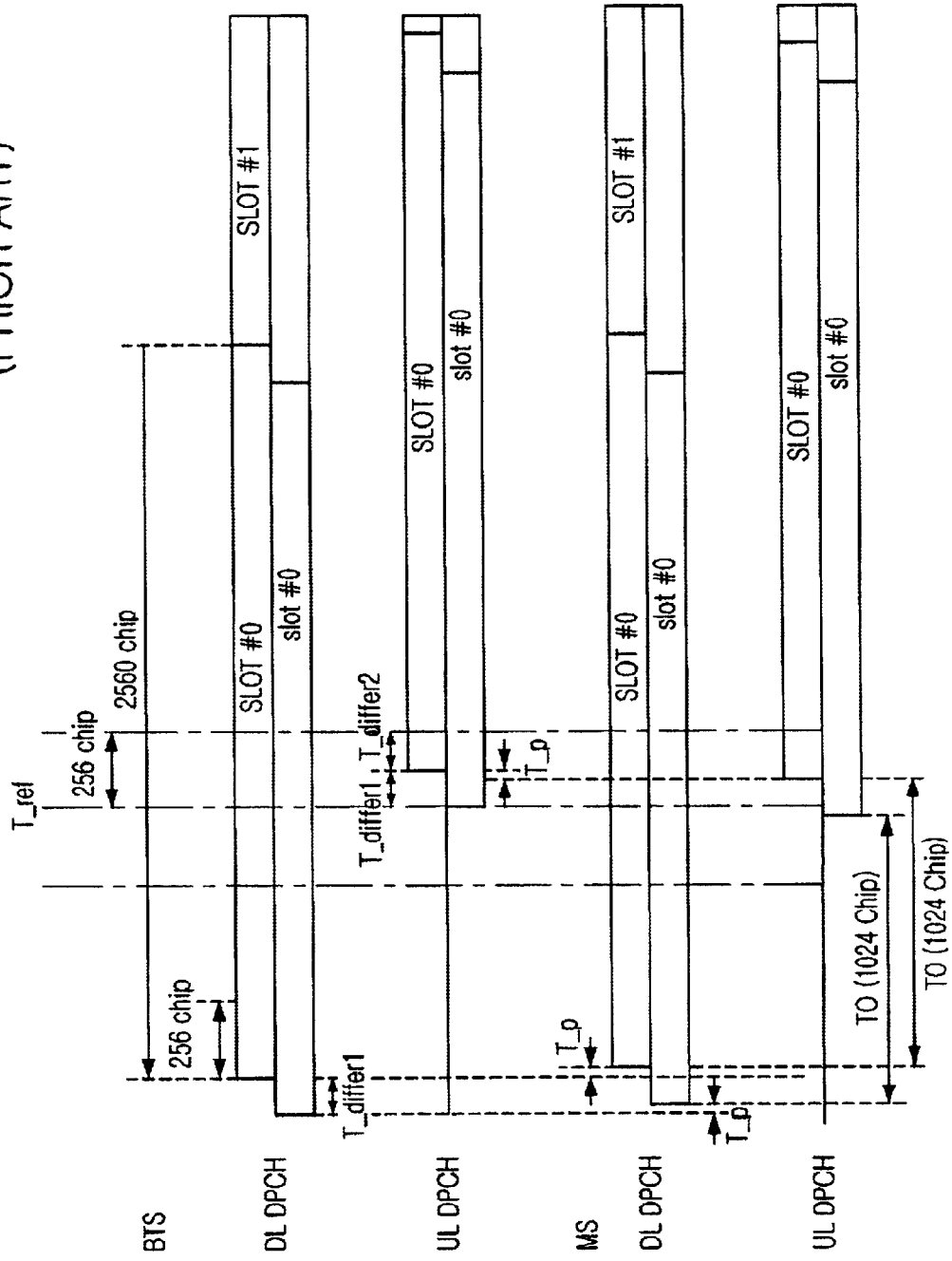
FIG. 6 is a timing diagram illustrating a case that transmission start time is advanced in order to adapt synchronization timing for USTS.

FIG. 6 is a timing diagram illustrating a case that transmission start time is advanced in order to adapt synchronization timing for USTS. FIG. 7 is a timing diagram illustrating a case that transmission start time is delayed in order to adapt synchronization timing for USTS.

Figure 7:
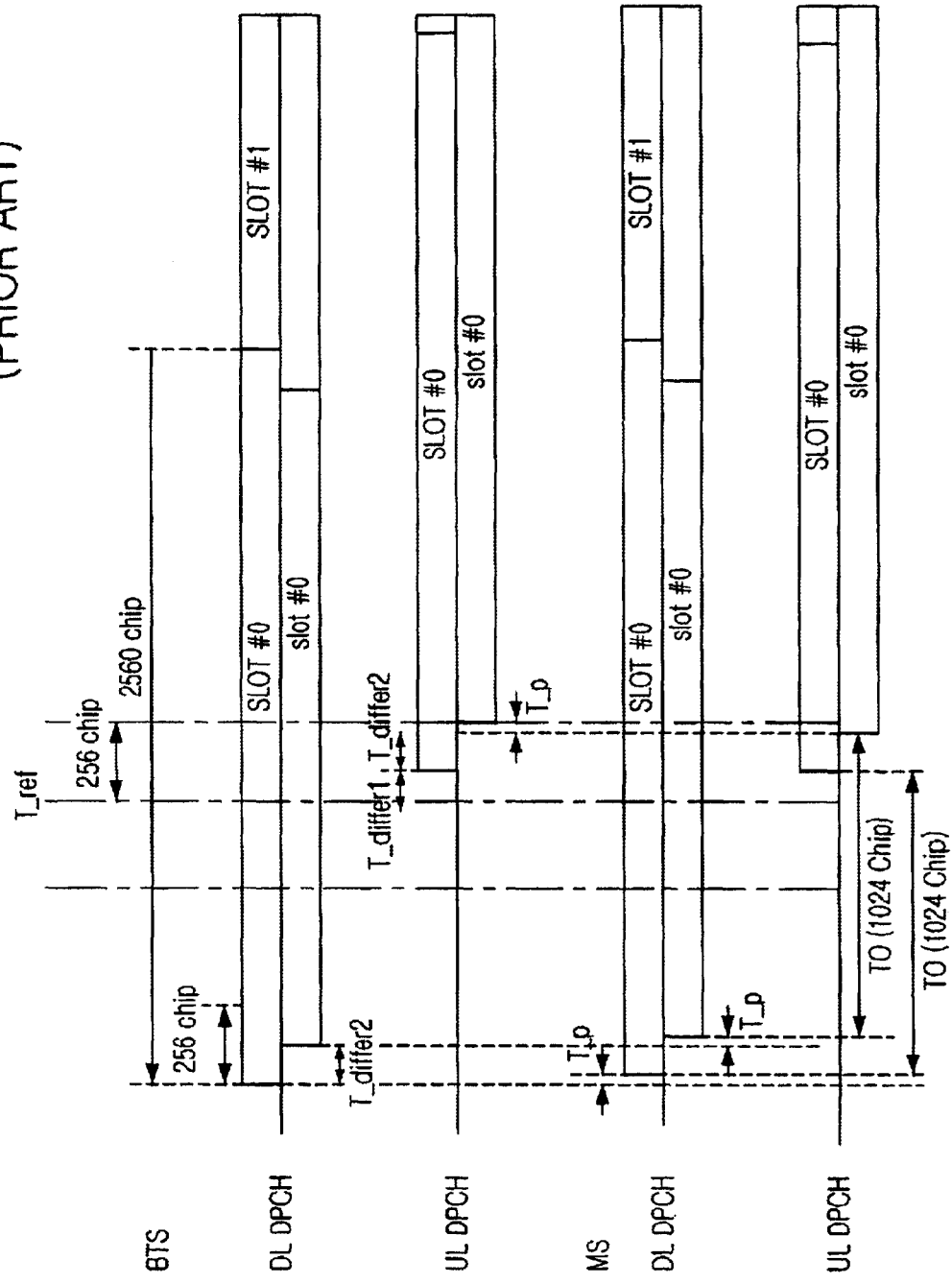
FIG. 7 is a timing diagram illustrating a case that transmission start time is delayed in order to adapt synchronization timing for USTS.

Referring to FIGS. 6 and 7, an upper slot represents a timing of the mobile telecommunication system when the system is operated as the non-USTS mode, and a lower slot represents when the system is operated as the USTS mode.

For mode conversion from the non-USTS mode to the USTS mode, a radio network controller (RNC) calculates a time difference between a reference time T_ref and a transmission start time of a data frame based on the reference time T_ref, i.e., a synchronization reference, a transmission start time of a downlink (DL) dedicated physical control channel (DPCCH) frame and an arrival start time of an uplink (UL) dedicated physical channel (DPCH) frame. At this case, two reference times can be selected based on the arrival start reference time of the uplink DPCH. In other words, there are a first reference time and a second reference time which are a shortly before and after the reference time on the basis of the arrival start time of the uplink DPCH data frame. The RNC can obtain a first and a second time differences T_differ1 and T_differ2 each having a value between 1 and 256 chips.

If a time shortly after the arrival start time of the uplink DPCH data frame is selected as the reference time, an initial time difference T_differ_init is calculated and compared with a subtraction value of the initial time difference T_differ_init from 256 chips, and then smaller one is selected as a time difference T_differ. If the initial time difference T_differ_init is set as the time difference, a transmission of the data frame should be delayed by the time difference for adaptation of synchronization. If the subtraction value is set as the time difference, the transmission should be advanced by the time difference.

In the other hands, if a time shortly before the arrival start time of the uplink DPCH data frame is selected as the reference time, an initial time difference T_differ_init is calculated and compared with a subtraction value of the initial time difference T_differ_init from 256 chips, and then smaller one is selected as a time difference T_differ. If the initial time difference T_differ_init is set as the time difference, a transmission should be advanced by the time difference for adaptation of synchronization. If the subtraction value is set as the time difference, the transmission should be delayed by the time difference.

In order to adapt the initial synchronization timing, the transmission of the DPCH frame should be adjusted by the time difference T_differ. If the transmission of the DPCH frame should be delayed by the time difference T_differ, the transmission is interrupted for the time difference T_differ. On the contrary, if the transmission of the DPCH frame should be advanced by the time difference T_differ, the DPCH frame is overlapped to the DPCH frame transmitted before the USTS mode, to thereby lose overlapped data frames.

Therefore, it is necessary a method for preventing the loss of the data frame. As mentioned above, the compressed mode used for a handover in the W-CDMA system can solve the problem.

The compressed mode used in the W-CDMA system by increasing a data rate for 10 ms data frame to be transmitted in a moment, can reduce a substantial data transmission time up to 5 ms, and therefore, another operation can be performed by the mobile station for the rest idle time. Control of the idle time is performed slot by slot based on information transmitted through a node B application protocol (NBAP) of an Iub interface and a radio resource control (RRC) message. The compressed mode is applied to continuous two data frames, and the transmission can be interrupted for up to 10 ms.

In order to apply the compressed mode to adjusting the timing for the USTS, it is only necessary for the data frames to be transmitted to include the last slot #15 or the first slot #1 of the data frame.

Figure 8:
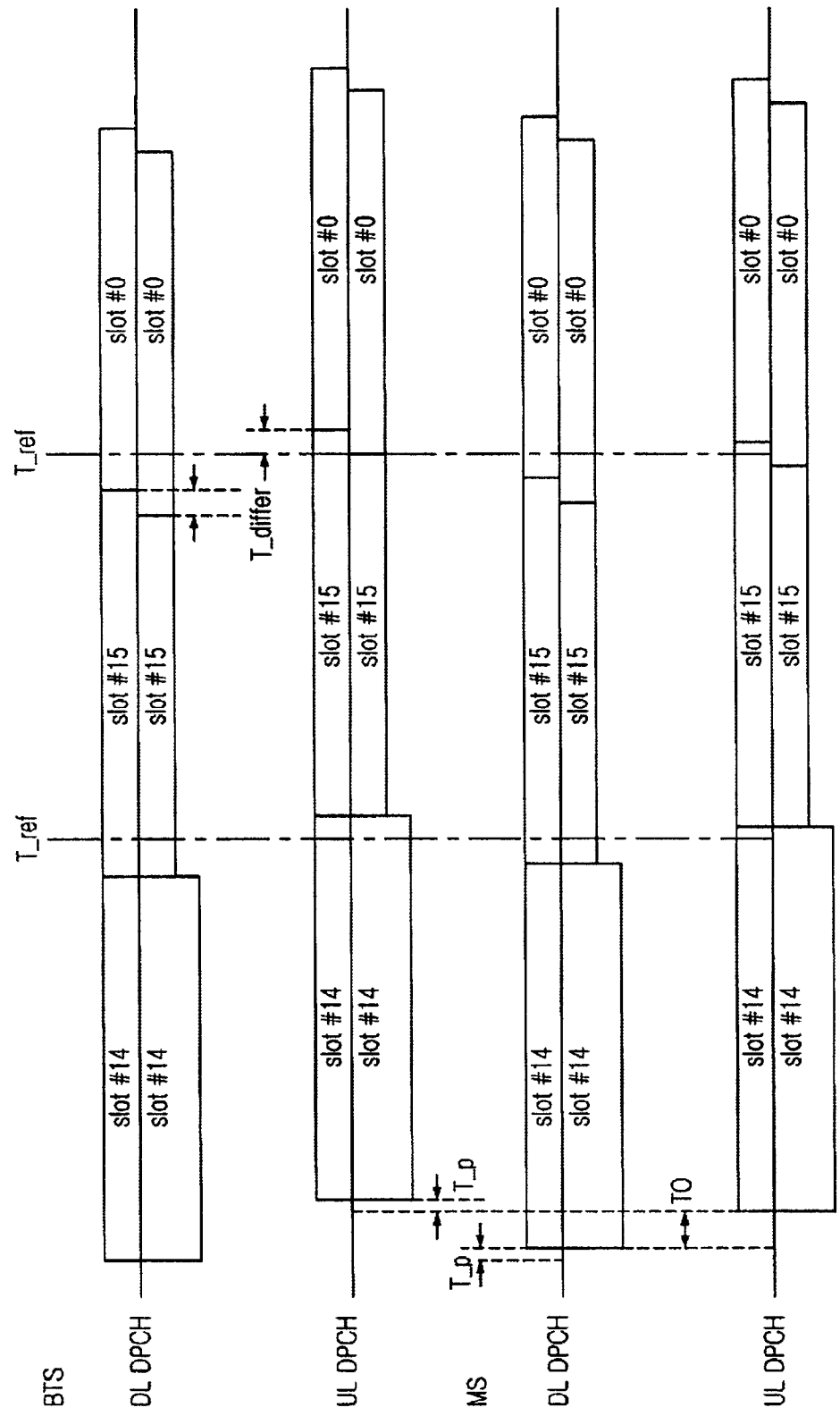
FIG. 8 is a timing diagram illustrating a case that transmission start time is advanced based on a compressed mode in order to adapt synchronization timing for USTS in accordance with the present invention.
Figure 9:
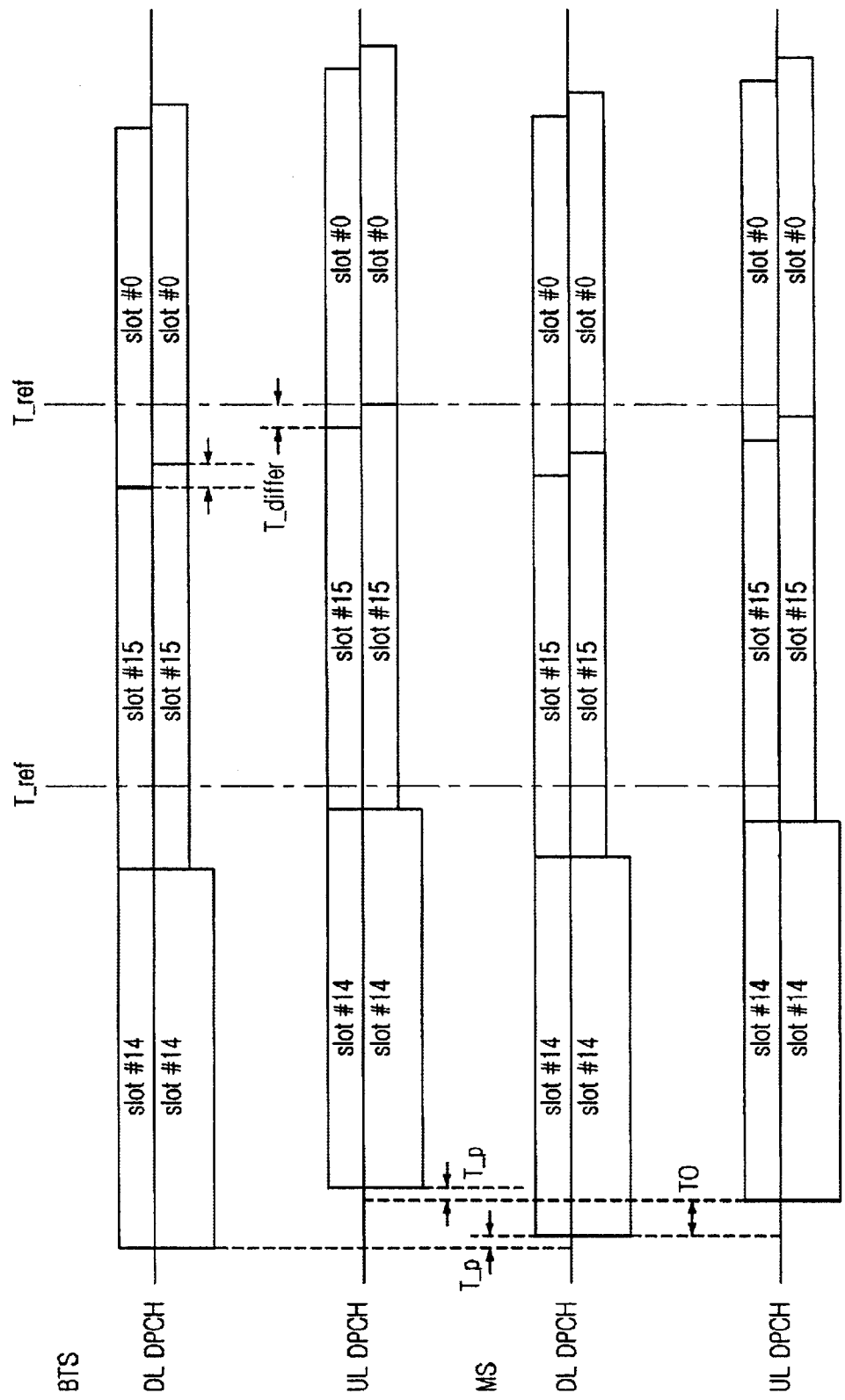
FIG. 9 is a timing diagram illustrating a case that transmission start time is delayed based on a compressed mode in order to adapt synchronization timing for USTS in accordance with the present invention.

FIG. 8 is a timing diagram illustrating a case that transmission start time is advanced based on a compressed mode in order to adapt synchronization timing for USTS in accordance with the present invention. FIG. 9 is a timing diagram illustrating a case that transmission start time is delayed based on a compressed mode in order to adapt synchronization timing for USTS in accordance with the present invention.

In case that the compressed mode is not used, the data transmission rate of the data frame for each slot is identical. However, in case of the compressed mode, the data transmission rate for the slot is faster than that in the normal mode which does not use the compressed mode. The time necessary for the substantial data transmission is shorter than 10 ms.

In the compressed mode, if the timing of the slot interrupted is adjusted, the timing synchronization can be performed without the loss of the data. In other words, for performing the USTS mode, the first slot or the last slot of the data frame, in which the data is not transmitted, is adjusted by the time difference.

In order to adjust the timing of the data frame, the mobile station and the BTS should receive an accurate timing, and therefore, information for the timing is necessary to be added to the RRC message and the NBAP message. The transmission of the timing can be applied to not only the first slot and the last slot but another slot of which transmission is interrupted in the compressed mode. In this case, an accurate timing for a corresponding slot should be calculated.

When the timing is adjusted based on the slot of which transmission is interrupted in the compressed mode, a length of the corresponding slot can be increased or decreased, which should be informed to the MS and the BTS before applying the compressed mode. Therefore, after adjusting the timing, the frame can be transmitted in the USTS mode.

Figure 10:
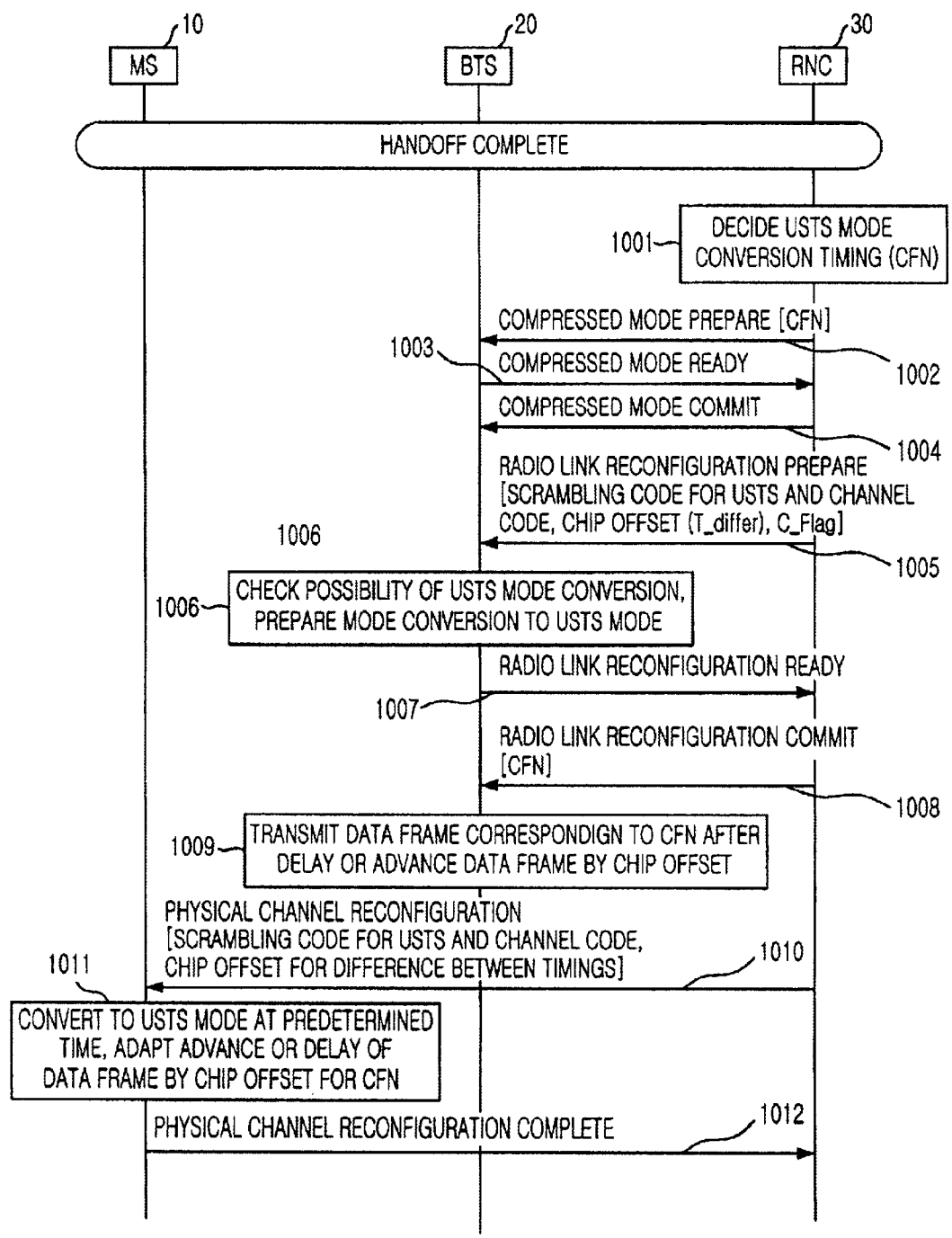
FIG. 10 is a flow chart illustrating a mode conversion process from non-USTS mode to USTS mode, which uses a compressed mode when performing a handover.

FIG. 10 is a flow chart illustrating a mode conversion process from non-USTS mode to USTS mode, which uses a compressed mode when performing a handover.

Referring to FIG. 10, a mode conversion process is described after the handover process is complete.

The RNC decides a scrambling code for USTS and a channel code and a mode conversion timing necessary for USTS operation at step 1001. After determining whether the mode conversion is performed for the data frame to which the compressed mode is to be applied (in case that transmission interruption section includes the last slot #15) or for the data frame to which the compressed mode was applied (in case that transmission interruption section includes the first slot #1), according to the determination result, frame numbers to which the compressed mode and the mode conversion are to be applied are selected.

In general, if the transmission interruption section includes the last slot #15, the frame number to which the compressed mode is to be applied, hereinafter, which is referred to as "a compressed mode frame number" in this specification, has a smaller value by one (1) than the frame number to which the mode conversion is to be applied, hereinafter, which is referred to as "a mode conversion frame number" in this specification. If the transmission interruption section includes the first slot #1, the compressed mode frame number has the same value as the mode conversion frame number.

In order to decide the compressed mode frame number and the mode conversion frame number as mentioned above, the RNC establishes parameters for the compressed mode operation by transmitting a compressed mode prepare message to the BTS at step 1002. The BTS informs the RNC that the operation of the compressed mode is ready, by transmitting a compressed mode ready message to the RNC at step 1003, and then the RNC informs the BTS of the data frame number to which the compressed mode is to be applied, by transmitting the compressed mode commit message to the BTS at step 1004.

The RNC calculates a time difference T_differ between a reference time of the BTS and an data arrival time from the MS, and transmits a scrambling code for the USTS and a channel code, the time difference T_differ (or a chip offset) to the BTS through a radio link reconfiguration prepare message at step 1005.

The BTS 20 prepares the mode conversion to the USTS mode based on the information received from the RNC, and informs the RNC that the mode conversion has been already prepared, by transmitting a radio link reconfiguration ready message at steps 1006 and 1007.

The RNC 30 transmits a mode conversion frame number to the BTS 20 through a radio link reconfiguration commit message to the BTS 20 at step 1008. After the mode conversion to the USTS mode, the BTS 20 adjusts transmission time by advancing or delaying transmission of the data frame by the time difference (or the chip offset).

The RNC 30 transmits a physical channel reconfiguration message having the scrambling code for the USTS, the channel code, the time difference T_differ (or chip offset), the mode conversion frame number and information for the compressed mode to the MS 10 through the BTS 20 at step 1009.

When the compressed mode is performed, the BTS 20 adjusts chip offset of the data frame for the mode conversion by the time difference, and transmits the data frame of which the chip offset is adjusted at step 1010.

At this time, the transmission time is adjusted during interruption of the transmission in the compressed mode at step 1011. In case that the transmission time is advanced, the last slot of the data frame for which the transmission is interrupted by the time difference T_differ is advanced and then transmitted. In case that the transmission time is delayed, the last slot of the data frame for which the transmission is interrupted by the time difference T_differ is delayed and then transmitted to the MS.

Similarly, at the MS, before the data frame having the mode conversion frame number is transmitted to the BTS, the data frame is adjusted by the time difference T_differ. In other words, the transmission of the uplink DPCH at the MS is always performed after the arrival start time of the downlink DPCH.

Therefore, a timing adjustment based on the time difference T_differ is complete, the MS generates and transmits a physical channel reconfiguration complete message to the RNC through the BTS at step 1012, thereby completing all processes of the handover.

Using the mode conversion of the present invention, the handover can be provided in the wireless telecommunication system supporting the USTS, such that the USTS technology can be implemented and widely used.

When selecting the reference time used for the mode conversion calculating the time difference, by using the compressed mode, the BTS can select a time difference near to the arrival start time of the data frame transmitted from the MS. In other words, the data transmission rate is increased based on the compressed mode, the data transmission time is reduced, and an idle time is generated. The BTS performs the mode conversion and the adjustment of the timing, thereby preventing from decreasing quality of telecommunication due to the handover.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for performing a handover of a mobile station in an asynchronous wireless telecommunication system supporting an uplink synchronous transmission scheme (USTS) mode, comprising the steps of:
   a) performing a mode conversion of the mobile station from the USTS mode to a non-USTS mode based on a first signal measurement result from the mobile station; and
   b) performing a handover for the mobile station.

2. The method as recited in claim 1, further comprising the step of:
   c) performing a mode conversion from the non-USTS mode to the USTS mode based on a second signal measurement result from the mobile station.

3. The method as recited in claim 2, wherein said step a) includes the steps of:
   a1) determining whether a ratio value of a power intensity of a pilot signal for a current cell to a power intensity of a pilot signal for an adjacent cell is smaller than a first predetermined threshold or not, based on the first signal measurement result; and
   a2) if the ratio value is smaller than the first predetermined threshold, performing the mode conversion from the USTS mode to the non-USTS mode.

4. The method as recited in claim 3, wherein said step c) includes the steps of:
   c1) determining whether the ratio value of the power intensity of the pilot signal for the current cell to the power intensity of the pilot signal for the adjacent cell is larger than a second predetermined threshold;
   c2) if the ratio value is larger than a second predetermined threshold, performing the mode conversion from the non-USTS mode to the USTS mode.

5. The method as recited in claim 4, wherein said step c2) includes the step of:
   c2-1) adjusting a transmission time of a data frame based on a compressed mode.

6. The method as recited in claim 5, wherein said step c2-1) includes the step of:
   c2-1-1) reducing a transmission interrupt time of a last slot of the data frame in order to advance the transmission time of the data frame.

7. The method as recited in claim 5, wherein said step c2-1) includes the step of:
   c2-1-2) increasing a transmission interrupt time of a last slot of the data frame in order to delay the transmission time of the data frame.

8. The method as recited in claim 6 or 7, wherein a compressed mode frame number is set as a smaller value by one (1) than a mode conversion frame number when the mode conversion is performed for the data frame to which the compressed mode is to be applied.

9. The method as recited in claim 6 or 7, wherein a compressed mode frame number is set as the same value as a mode conversion frame number when the mode conversion is performed for the data frame to which the compressed mode is to be applied.

10. The method as recited in claim 5, wherein the handover is a soft handover.

11. The method as recited in claim 5, wherein the handover is a hard handover.

12. The method as recited in claim 5, wherein said step a) further includes the steps of:
   a3) at the source RNC, establishing a physical channel with a source base transceiver station (BTS) by assigning a scrambling code for the non-USTS mode and an orthogonal code; and
   a4) at the source RNC, performing the mode conversion of the mobile station from the USTS mode to the non-USTS mode based on the physical channel.

13. The method as recited in claim 4, wherein said step c) further includes the steps of:
   c3) at the target RNC, assigning a scrambling code for the USTS mode and a channel code, requesting a target BTS to perform reconfiguration of a radio link by transmitting a chip offset measurement request indicator along with the assigned codes;
   c4) at the target BTS, measuring and transmitting the chip offset to the target RNC, and performing the reconfiguration of the radio link based on a start time of the USTS mode and a command to perform the reconfiguration of the radio link received from the target RNC; and
   c5) at the target RNC, transmitting a physical channel reconfiguration message having the scrambling code, the channel code and the initial synchronization timing information to the mobile station, thereby performing the mobile station from the non-USTS mode to the USTS mode.

14. The method as recited in claim 5, wherein said step c2-1) includes the steps of:
   c2-1-1) at the target RNC, requesting the target BTS to prepare the compressed mode in order to reduce the transmission time of the data frame;
   c2-1-2) calculating a time difference between the reference time of the target BTS and the arrival time of the data frame from the mobile station;
   c2-1-3) transmitting a scrambling code for the USTS, a channel code and the time difference to the target BTS;
   c2-1-4) if preparation for the USTS mode is complete based on the scrambling code for the USTS, the channel code and the time difference, transmitting a radio link reconfiguration ready message to the target RNC;
   c2-1-5) if the radio link reconfiguration is committed, performing the mode conversion from the non-USTS mode to the USTS mode and adjusting the transmission time of the data frame by the time difference;
   c2-1-6) transmitting the scrambling code for the USTS, the channel code, a mode conversion frame number and the time difference to the mobile station; and
   c2-1-7) adjusting the data frame having the mode conversion frame number by the time difference.

15. A method for performing a handover of a mobile station from a cell not supporting an uplink synchronous transmission scheme (USTS) mode to a cell supporting the USTS mode, the method comprising the steps of:
   a) performing a handover of the mobile station; and
   b) performing a mode conversion of the mobile station from a non-USTS mode to the USTS mode based on a signal measurement result from the mobile station.

16. The method as recited in claim 15, wherein said step b) includes the steps of:
   b1) determining whether the ratio value of the power intensity of the pilot signal for the current cell to the power intensity of the pilot signal for the adjacent cell is larger than a second predetermined threshold;

b2) if the ratio value is larger than a second predetermined threshold, performing the mode conversion from the non-USTS mode to the USTS mode.

17. The method as recited in claim 16, wherein said step b2) includes the step of:

b2-1) adjusting a transmission time of a data frame based on a compressed mode.

18. The method as recited in claim 17, wherein said step b2-1) includes the step of:

b2-1-1) reducing a transmission interrupt time of a last slot of the data frame in order to advance the transmission time of the data frame.

19. The method as recited in claim 17, wherein said step c2-1) includes the step of:

b2-1-2) increasing a transmission interrupt time of a last slot of the data frame in order to delay the transmission time of the data frame.

20. The method as recited in claim 18 or 19, wherein a compressed mode frame number is set as a smaller value by one (1) than a mode conversion frame number when the mode conversion is performed for the data frame to which the compressed mode is to be applied.

21. The method as recited in claim 18 or 19, wherein a compressed mode frame number is set as the same value as a mode conversion frame number when the mode conversion is performed for the data frame to which the compressed mode is to be applied.

22. The method as recited in claim 17, wherein the handover is a soft handover.

23. The method as recited in claim 17, wherein the handover is a hard handover.

24. The method as recited in claim 16, wherein said step b) further includes the steps of:

b3) at the target RNC, assigning a scrambling code for the USTS mode and a channel code, requesting a target BTS to perform reconfiguration of a radio link by transmitting a chip offset measurement request indicator along with the assigned codes;

b4) at the target BTS, measuring and transmitting the chip offset to the target BTS, and performing the reconfiguration of the radio link based on a start time of the USTS mode and a command to perform the reconfiguration of the radio link received from the target RNC; and b5) at the target RNC, transmitting a physical channel reconfiguration message having the scrambling code, the channel code and the initial synchronization timing information to the mobile station, thereby performing the mobile station from the non-USTS mode to the USTS mode.

25. The method as recited in claim 17, wherein said step b2-1) includes the steps of:

b2-1-1) at the target RNC, requesting the target BTS to prepare the compressed mode in order to reduce the transmission time of the data frame;

b2-1-2) calculating a time difference between the reference time and the arrival time of the data frame from the mobile station;

b2-1-3) transmitting a scrambling code for the USTS, a channel code and the time difference to the target BTS;

b2-1-4) if preparation for the USTS mode is complete based on the scrambling code for the USTS, the channel code and the time difference, transmitting a radio link reconfiguration ready message to the target RNC;

b2-1-5) if the radio link reconfiguration is committed, performing the mode conversion from the non-USTS mode to the USTS mode and adjusting the transmission time of the data frame by the time difference;

b2-1-6) transmitting the scrambling code for the USTS, the channel code, a mode conversion frame number and the time difference to the mobile station; and b2-1-7) adjusting the data frame having the mode conversion frame number by the time difference.

26. A computer readable recording media storing instructions for executing a method for performing a handover of a mobile station in an asynchronous wireless telecommunication system supporting an uplink synchronous transmission scheme (USTS) mode, the method comprising the steps of:

a) performing a mode conversion of the mobile station from the USTS mode to a non-USTS mode based on a first signal measurement result from the mobile station; and b) performing a handover for the mobile station.

27. The computer readable recording media method as recited in claim 26, wherein the method further includes the step of:

c) performing a mode conversion from the non-USTS mode to the USTS mode based on a second signal measurement result from the mobile station.

28. A computer readable recording media storing instructions for executing a method for performing a handover of a mobile station from a cell not supporting an uplink synchronous transmission scheme (USTS) mode to a cell supporting the USTS mode, the method comprising the steps of:

a) performing a handover of the mobile station; and b) performing a mode conversion of the mobile station from a non-USTS mode to the USTS mode based on a signal measurement result from the mobile station.

* * * * *

UNITED STATES PATENT AND TRADEMARK OFFICE
CERTIFICATE OF CORRECTION

PATENT NO. : 6,892,071 B2
APPLICATION NO. : 09/927729
DATED : May 10, 2005
INVENTOR(S) : Park et al.

It is certified that error appears in the above-identified patent and that said Letters Patent is hereby corrected as shown below:

In Drawings, Fig. 1, insert the phrase -- (Prior Art) --.

In Drawings, Fig. 2, insert the phrase -- (Prior Art) --.

Signed and Sealed this

Twenty-fifth Day of December, 2007

JON W. DUDAS
*Director of the United States Patent and Trademark Office*